United States Patent
Daimler et al.

(10) Patent No.: US 11,232,142 B2
(45) Date of Patent: *Jan. 25, 2022

(54) FLEXIBLE REAL ESTATE SEARCH

(71) Applicant: Zillow, Inc., Seattle, WA (US)

(72) Inventors: Matthew Scott Daimler, New York, NY (US); Susan Beth Daimler, New York, NY (US)

(73) Assignee: Zillow, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/916,552

(22) Filed: Jun. 30, 2020

(65) Prior Publication Data
US 2020/0334279 A1    Oct. 22, 2020

Related U.S. Application Data

(63) Continuation of application No. 14/078,076, filed on Nov. 12, 2013, now Pat. No. 10,754,884.

(51) Int. Cl.
*G06F 16/00* (2019.01)
*G06F 16/335* (2019.01)

(52) U.S. Cl.
CPC .................. *G06F 16/335* (2019.01)

(58) Field of Classification Search
CPC ............... G06F 16/335; G06F 16/2428
USPC ........................................ 707/754
See application file for complete search history.

(56) References Cited

U.S. PATENT DOCUMENTS

| | | | |
|---|---|---|---|
| 4,870,576 A | 9/1989 | Tornetta | |
| 5,361,201 A | 11/1994 | Jost et al. | |
| 5,414,621 A | 5/1995 | Hough | |
| 5,584,025 A | 12/1996 | Keithley et al. | |
| 5,680,305 A | 10/1997 | Apgar, IV | |
| 5,754,850 A | 5/1998 | Janssen | |
| 5,794,216 A | 8/1998 | Brown | |
| 5,855,011 A | 12/1998 | Tatsuoka | |
| 5,857,174 A | 1/1999 | Dugan | |
| 6,115,694 A | 9/2000 | Cheetham et al. | |
| 6,178,406 B1 | 1/2001 | Cheetham et al. | |
| 6,240,425 B1 | 5/2001 | Naughton | |
| 6,260,033 B1 | 7/2001 | Tatsuoka | |
| 6,301,571 B1 | 10/2001 | Tatsuoka | |
| 6,397,208 B1 | 5/2002 | Lee | |

(Continued)

FOREIGN PATENT DOCUMENTS

| | | |
|---|---|---|
| EP | 1903491 | 3/2008 |
| WO | WO9524687 | 9/1995 |

(Continued)

OTHER PUBLICATIONS

Final Office Action for U.S. Appl. No. 11/927,623, dated Apr. 1, 2021, 18 pages.

(Continued)

*Primary Examiner* — Thanh-Ha Dang

(74) *Attorney, Agent, or Firm* — Perkins Coie LLP

(57) ABSTRACT

A facility for adjusting a display of a result of searching a property database is described. The facility, after displaying a list of properties satisfying a search filter, allows a user to specify property attributes the values of which are not currently shown for the properties, and redisplays the list of properties by additionally showing the values of those property attributes for the properties.

20 Claims, 7 Drawing Sheets

(56) References Cited

U.S. PATENT DOCUMENTS

| | | |
|---|---|---|
| 6,401,070 B1 | 6/2002 | Mc Manus |
| 6,446,261 B1 | 9/2002 | Rosser |
| 6,493,721 B1 | 12/2002 | Getchius et al. |
| 6,597,983 B2 | 7/2003 | Hancock |
| 6,609,118 B1 | 8/2003 | Khedkar et al. |
| 6,615,187 B1 | 9/2003 | Ashenmil |
| 6,618,715 B1 | 9/2003 | Johnson et al. |
| 6,684,196 B1 | 1/2004 | Mini et al. |
| 6,760,707 B2 | 7/2004 | Provost |
| 6,876,955 B1 | 4/2005 | Fleming |
| 6,877,015 B1 | 4/2005 | Kilgore |
| 6,915,206 B2 | 7/2005 | Sasajima |
| 7,016,866 B1 | 3/2006 | Chin et al. |
| 7,092,918 B1 | 8/2006 | Delurgio et al. |
| 7,120,599 B2 | 10/2006 | Keyes |
| 7,130,810 B2 | 10/2006 | Foster et al. |
| 7,219,078 B2 | 5/2007 | Lamont et al. |
| 7,249,146 B2 | 7/2007 | Brecher |
| 7,289,965 B1 | 10/2007 | Bradley et al. |
| 7,454,355 B2 * | 11/2008 | Milman ............... G06Q 30/02 705/313 |
| 7,461,265 B2 | 12/2008 | Ellmore |
| 7,487,114 B2 | 2/2009 | Florance et al. |
| 7,567,262 B1 | 7/2009 | Clemens et al. |
| 7,711,574 B1 | 5/2010 | Bradley et al. |
| 7,725,359 B1 | 5/2010 | Katzfey et al. |
| 7,783,562 B1 | 8/2010 | Ellis |
| 7,788,186 B1 | 8/2010 | An et al. |
| 7,827,128 B1 | 11/2010 | Yan et al. |
| 7,848,966 B2 | 12/2010 | Charuk et al. |
| 7,933,798 B1 | 4/2011 | Yan et al. |
| 7,962,353 B1 | 6/2011 | Menzies |
| 7,970,674 B2 | 6/2011 | Cheng et al. |
| 8,001,024 B2 | 8/2011 | Graboske et al. |
| 8,015,091 B1 | 9/2011 | Ellis |
| 8,032,401 B2 | 10/2011 | Choubey |
| 8,051,089 B2 | 11/2011 | Gargi et al. |
| 8,095,434 B1 | 1/2012 | Puttick et al. |
| 8,140,421 B1 | 3/2012 | Humphries et al. |
| 8,180,697 B2 | 5/2012 | Frischer |
| 8,190,516 B2 | 5/2012 | Ghosh et al. |
| 8,370,267 B2 | 2/2013 | Carey et al. |
| 8,386,395 B1 | 2/2013 | Gordon et al. |
| 8,401,877 B2 | 3/2013 | Salvagio |
| 8,433,512 B1 | 4/2013 | Lopatenko |
| 8,473,347 B1 | 6/2013 | Koningstein |
| 8,515,839 B2 | 8/2013 | Ma et al. |
| 8,521,619 B2 | 8/2013 | Perry, III et al. |
| 8,583,562 B1 | 11/2013 | McDaniel |
| 8,628,151 B1 | 1/2014 | Allen |
| 8,650,067 B1 | 2/2014 | Moss |
| 8,660,919 B2 | 2/2014 | Kasower |
| 8,676,680 B2 | 3/2014 | Humphries et al. |
| 8,775,300 B2 | 7/2014 | Showalter |
| 9,536,011 B1 | 1/2017 | Kirillov |
| 9,605,704 B1 | 3/2017 | Humphries et al. |
| 10,198,735 B1 | 2/2019 | Humphries et al. |
| 10,380,653 B1 | 8/2019 | Flint et al. |
| 10,460,406 B1 | 10/2019 | Humphries et al. |
| 10,643,232 B1 | 5/2020 | Wang et al. |
| 10,754,884 B1 * | 8/2020 | Daimler ............... G06F 16/335 |
| 10,789,549 B1 | 9/2020 | Bruce et al. |
| 2001/0039506 A1 | 4/2001 | Robbins |
| 2001/0044766 A1 | 11/2001 | Keyes |
| 2002/0007336 A1 | 1/2002 | King et al. |
| 2002/0035520 A1 | 3/2002 | Weiss |
| 2002/0052814 A1 | 5/2002 | Ketterer |
| 2002/0082903 A1 | 6/2002 | Yasuzawa et al. |
| 2002/0087389 A1 | 7/2002 | Sklarz et al. |
| 2002/0188689 A1 | 12/2002 | Michael |
| 2003/0004781 A1 | 1/2003 | Mallon |
| 2003/0149658 A1 | 1/2003 | Rossbach et al. |
| 2003/0046099 A1 | 3/2003 | Lamont et al. |
| 2003/0055747 A1 | 3/2003 | Carr et al. |
| 2003/0078878 A1 | 4/2003 | Opsahi-Ong |
| 2003/0078897 A1 | 4/2003 | Florance et al. |
| 2003/0101063 A1 | 5/2003 | Sexton et al. |
| 2003/0101074 A1 | 5/2003 | Suzuki et al. |
| 2003/0110122 A1 | 6/2003 | Nalebuff et al. |
| 2003/0115164 A1 | 6/2003 | Jeng |
| 2003/0191723 A1 | 10/2003 | Foretich et al. |
| 2003/0212565 A1 | 11/2003 | Badali et al. |
| 2004/0019517 A1 | 1/2004 | Sennott |
| 2004/0030616 A1 * | 2/2004 | Florance ............... G06Q 30/06 705/51 |
| 2004/0039629 A1 | 2/2004 | Hoffman et al. |
| 2004/0049440 A1 | 3/2004 | Shinoda et al. |
| 2004/0054605 A1 | 3/2004 | Whittet |
| 2004/0059688 A1 | 3/2004 | Dominguez et al. |
| 2004/0073508 A1 | 4/2004 | Foster et al. |
| 2004/0093270 A1 | 5/2004 | Gilbert |
| 2004/0128215 A1 | 7/2004 | Florance |
| 2004/0153330 A1 | 8/2004 | Miller |
| 2004/0153663 A1 | 8/2004 | Clark et al. |
| 2004/0220872 A1 | 11/2004 | Pollock |
| 2004/0243470 A1 | 12/2004 | Ozer et al. |
| 2004/0254803 A1 | 12/2004 | Myr |
| 2004/0267657 A1 | 12/2004 | Hecht |
| 2005/0071376 A1 | 3/2005 | Modi |
| 2005/0080702 A1 | 4/2005 | Modi |
| 2005/0240429 A1 | 4/2005 | Dieden et al. |
| 2005/0108084 A1 | 5/2005 | Ramamoorti et al. |
| 2005/0154656 A1 | 7/2005 | Kim et al. |
| 2005/0154657 A1 | 7/2005 | Kim et al. |
| 2005/0154664 A1 | 7/2005 | Guy et al. |
| 2005/0187778 A1 | 8/2005 | Mitchell |
| 2005/0192930 A1 | 9/2005 | Hightower et al. |
| 2005/0254803 A1 | 11/2005 | Myr |
| 2005/0288942 A1 | 12/2005 | Graboske et al. |
| 2005/0288957 A1 | 12/2005 | Eraker |
| 2006/0015357 A1 | 1/2006 | Cagan |
| 2006/0020424 A1 | 1/2006 | Quindel |
| 2006/0080114 A1 * | 4/2006 | Bakes ................. G06Q 50/16 705/1.1 |
| 2006/0085210 A1 | 4/2006 | Owens |
| 2006/0089842 A1 | 4/2006 | Medawar |
| 2006/0105342 A1 | 5/2006 | Villena et al. |
| 2006/0122918 A1 | 6/2006 | Graboske et al. |
| 2006/0248555 A1 | 6/2006 | Eldering |
| 2006/0167710 A1 | 7/2006 | King et al. |
| 2006/0287810 A1 | 12/2006 | Sadri et al. |
| 2007/0005373 A1 | 1/2007 | Villena et al. |
| 2007/0043770 A1 | 2/2007 | Goodrich et al. |
| 2007/0050342 A1 * | 3/2007 | Inkinen ............... G06Q 30/02 |
| 2007/0067180 A1 | 3/2007 | James et al. |
| 2007/0106523 A1 | 5/2007 | Eaton et al. |
| 2007/0124235 A1 | 5/2007 | Chakraborty et al. |
| 2007/0132727 A1 | 6/2007 | Garbow et al. |
| 2007/0143132 A1 | 6/2007 | Linne et al. |
| 2007/0143312 A1 | 6/2007 | Wiseman |
| 2007/0150353 A1 | 6/2007 | Krassner |
| 2007/0244780 A1 | 10/2007 | Liu |
| 2007/0255581 A1 | 11/2007 | Otto et al. |
| 2007/0265960 A1 | 11/2007 | Advani |
| 2008/0004893 A1 | 1/2008 | Graboske et al. |
| 2008/0015890 A1 | 1/2008 | Malyala |
| 2008/0027857 A1 | 1/2008 | Benson |
| 2008/0077458 A1 | 3/2008 | Andersen et al. |
| 2008/0086356 A1 | 4/2008 | Glassman et al. |
| 2008/0109409 A1 | 5/2008 | Hengel |
| 2008/0133319 A1 | 6/2008 | Adiga et al. |
| 2008/0183598 A1 | 7/2008 | Carr et al. |
| 2008/0255921 A1 | 10/2008 | Flake et al. |
| 2008/0288335 A1 | 11/2008 | Goldberg |
| 2008/0301064 A1 | 12/2008 | Burns |
| 2008/0312942 A1 | 12/2008 | Katta et al. |
| 2009/0006185 A1 | 1/2009 | Stinson |
| 2009/0030707 A1 | 1/2009 | Green |
| 2009/0030864 A1 | 1/2009 | Pednault et al. |
| 2009/0037328 A1 | 2/2009 | Abuaf |
| 2009/0043603 A1 | 2/2009 | Rutherford et al. |
| 2009/0043637 A1 | 2/2009 | Eder |
| 2009/0048938 A1 | 2/2009 | Pray |
| 2009/0076902 A1 | 3/2009 | Grinsted et al. |

(56) References Cited

U.S. PATENT DOCUMENTS

| | | |
|---|---|---|
| 2009/0132316 A1 | 5/2009 | Florance et al. |
| 2009/0144097 A1 | 6/2009 | Fassio et al. |
| 2009/0150216 A1 | 6/2009 | Milman et al. |
| 2009/0164464 A1 | 6/2009 | Carrico et al. |
| 2009/0210287 A1 | 8/2009 | Chickering et al. |
| 2009/0240586 A1 | 9/2009 | Ramer et al. |
| 2009/0265285 A1 | 10/2009 | Balaishis |
| 2009/0287596 A1 | 11/2009 | Torrenegra |
| 2010/0005019 A1 | 1/2010 | Yang et al. |
| 2010/0023379 A1 | 1/2010 | Rappaport |
| 2010/0076881 A1 | 3/2010 | O'Grady |
| 2010/0094548 A1 | 4/2010 | Tadman et al. |
| 2010/0114678 A1 | 5/2010 | Axe et al. |
| 2010/0161471 A1 | 6/2010 | Fendick |
| 2010/0161498 A1 | 6/2010 | Walker |
| 2010/0318451 A1 | 12/2010 | Niccolini |
| 2011/0047083 A1 | 2/2011 | Lawler |
| 2011/0066510 A1 | 3/2011 | Talegon |
| 2011/0066561 A1 | 3/2011 | Lazarre et al. |
| 2011/0071899 A1 | 3/2011 | Robertson et al. |
| 2011/0196762 A1 | 8/2011 | DuPont |
| 2011/0218934 A1 | 9/2011 | Elser |
| 2011/0218937 A1 | 9/2011 | Elser |
| 2011/0251967 A1 | 10/2011 | Klivington |
| 2011/0251974 A1 | 10/2011 | Woodward et al. |
| 2011/0270779 A1 | 11/2011 | Showalter |
| 2012/0005111 A2 | 1/2012 | Lowenstein et al. |
| 2012/0011075 A1 | 1/2012 | Graboske et al. |
| 2012/0030092 A1 | 2/2012 | Marshall et al. |
| 2012/0072357 A1 | 3/2012 | Bradford |
| 2012/0078770 A1 | 3/2012 | Hecht |
| 2012/0254045 A1 | 4/2012 | Orfano |
| 2012/0158459 A1 | 6/2012 | Villena et al. |
| 2012/0191541 A1 | 7/2012 | Yang et al. |
| 2012/0311431 A1 | 12/2012 | Breaker et al. |
| 2012/0323798 A1 | 12/2012 | Den Herder |
| 2012/0330719 A1 | 12/2012 | Malaviya et al. |
| 2013/0041841 A1 | 2/2013 | Lyons |
| 2013/0103459 A1 | 4/2013 | Marshall et al. |
| 2013/0159166 A1 | 6/2013 | Irick |
| 2013/0304654 A1 | 7/2013 | Ma et al. |
| 2013/0332877 A1 | 12/2013 | Florance et al. |
| 2013/0339255 A1 | 12/2013 | Talbird |
| 2014/0012720 A1 | 1/2014 | O'Kane |
| 2014/0236845 A1 | 1/2014 | Humphries et al. |
| 2014/0180936 A1 | 6/2014 | Ma et al. |
| 2014/0316999 A1 | 6/2014 | Cheng et al. |
| 2014/0257924 A1 | 9/2014 | Xie |
| 2014/0279692 A1 | 9/2014 | Boothby et al. |
| 2014/0316857 A1 | 10/2014 | Roberts |
| 2014/0372203 A1 | 12/2014 | Powell et al. |
| 2015/0006311 A1 | 1/2015 | Murugappan et al. |
| 2015/0006605 A1 | 1/2015 | Chu et al. |
| 2015/0066834 A1 | 3/2015 | Jeffries |
| 2015/0088766 A1 | 3/2015 | Krause |
| 2015/0149275 A1 | 5/2015 | Bax et al. |
| 2015/0269264 A1 | 9/2015 | Bolen |
| 2015/0356576 A1 | 12/2015 | Malaviya |
| 2015/0379588 A1 | 12/2015 | Ma |
| 2016/0048934 A1 | 2/2016 | Gross |
| 2016/0171622 A1 | 6/2016 | Perkins et al. |
| 2016/0292800 A1 | 10/2016 | Smith |
| 2018/0232787 A1 | 8/2018 | Dupray |
| 2018/0260918 A1 | 9/2018 | VanderMey |
| 2019/0005553 A1 | 1/2019 | Humphries |
| 2019/0355026 A1 | 11/2019 | Flint et al. |

FOREIGN PATENT DOCUMENTS

| | | |
|---|---|---|
| WO | WO0055771 | 9/2000 |
| WO | WO0211038 | 2/2002 |
| WO | WO0242980 | 5/2002 |
| WO | WO03100692 | 12/2003 |
| WO | WO2005015441 | 2/2005 |
| WO | WO2006025830 | 3/2006 |
| WO | WO2006043951 | 4/2006 |
| WO | WO2007051892 | 5/2007 |
| WO | WO2014137510 | 9/2014 |

OTHER PUBLICATIONS

Final Office Action for U.S. Appl. No. 13/828,680, dated Dec. 15, 2020, 59 pages.

Final Office Action for U.S. Appl. No. 14/524,148, dated Jan. 29, 2021, 55 pages.

Final Office Action for U.S. Appl. No. 14/709,719, dated Mar. 9, 2021, 42 pages.

Final Office Action for U.S. Appl. No. 15/715,098, dated Jul. 13, 2021, 31 pages.

Final Office Action for U.S. Appl. No. 15/698,276, dated Jun. 24, 2021, 7 pages.

Hamzaoui, Y. E.et al., "Application of Artificial Neural Networks to Predict the Selling Price in the Real Estate Valuation Process," 2011 10th Mexican International Conference on Artificial Intelligence, Puebla, 2011, pp. 175-181 (Year: 2011).

Jianxiao, G. et al., "Analysis of influencing factors in real estate prices based on stochastic gradient regression model," 2009 16th International Conference on Industrial Engineering and Engineering Management, Beijing, 2009.

Khalafallah, A. "Neural network based model for predicting housing market performance," in Tsinghua Science and Technology, vol. 13, No. S1, pp. 325-328, Oct. 2008 (Year: 2008).

Liang, Y. et al., "Research on real estate and its application of refraining the speculation," BioTechnology, An Indian Journal, 10(9), 3160-3166, 2014.

New CoreLogic Data Reveals Q2 Negative Equity Declines in Hardest Hit Markets and 8 Million Negative Equity Borrowers Have Above Market Rates, CoreLogic Press Release. Sep. 13, 2011, 5 pages.

Non-Final Office Action for U.S. Appl. No. 11/927,623, dated Nov. 12, 2020, 19 pages.

Non-Final Office Action for U.S. Appl. No. 14/640,860, dated Jul. 15, 2021, 109 pages.

Non-Final Office Action for U.S. Appl. No. 14/709,719, dated Aug. 4, 2021, 40 pages.

Non-Final Office Action for U.S. Appl. No. 14/721,437, dated Jan. 4, 2021, 72 pages.

Non-Final Office Action for U.S. Appl. No. 15/698,276, dated Feb. 5, 2021, 41 pages.

Non-Final Office Action for U.S. Appl. No. 15/715,098, dated Jan. 4, 2021, 26 pages.

Non-Final Office Action for U.S. Appl. No. 15/789,617, dated Mar. 11, 2021, 52 pages.

Non-Final Office Action for U.S. Appl. No. 16/125,318, dated Apr. 29, 2021, 25 pages.

Non-Final Office Action for U.S. Appl. No. 16/129,282, dated Feb. 1, 2021, 33 pages.

Non-Final Office Action for U.S. Appl. No. 16/235,009, dated Dec. 4, 2020, 9 pages.

Non-Final Office Action for U.S. Appl. No. 16/449,210, dated Mar. 26, 2021, 17 pages.

Non-Final Office Action for U.S. Appl. No. 16/748,172, dated May 12, 2021, 58 pages.

Notice of Allowance for U.S. Appl. No. 14/325,094, dated Dec. 16, 2020, 10 pages.

Notice of Allowance for U.S. Appl. No. 14/721,437, dated Apr. 14, 2021, 13 pages.

Notice of Allowance for U.S. Appl. No. 16/235,009, dated Mar. 24, 2021, 7 pages.

The Tim. Top 30 Cities: Price to Rent & Price to Income Ratios (2011). Seattle Bubble, Mar. 29, 2013, 14 pages.

Trulia.com. Trulia's rent vs. buy index reveals top 10 cities for renting, owning homes. Oct. 2010, pp. 1-4.

U.S. Appl. No. 17/130,922 for Ma et al., filed Dec. 22, 2020.

U.S. Appl. No. 17/206,838 for Bruce et al., filed Mar. 19, 2021.

U.S. Appl. No. 17/231,880 for Humphries et al., foiled Apr. 15, 2021.

(56) References Cited

OTHER PUBLICATIONS

U.S. Appl. No. 17/354,827 for Humphries et al., filed Jun. 22, 2021.
U.S. Appl. No. 17/373,446 for Humphries et al., filed Jul. 12, 2021.
"2002 Inman Innovator Award Nominees Announced," PR Newswire, Jul. 16, 2002, 3 pages.
"About Reis, Products & Services," [online], Retrieved from the Internet via the Wayback Machine dated Feb. 5, 2002 on Jun. 13, 2013, URL: http://reis.com/about/aboutproducts_rentcomps.cfm, 2 pages.
"An Introduction to R," <http://web.archive.org/web/20060118050840/http://cran.r-project.org/doc/manuals/R-intro.html>, [internet archive date: Jan. 18, 2006], pp. 1-105.
"Banton Technologies Announces National Home Evaluation Coverage; Company's ValueWizard 3.0 Assesses All Regions of the United States," Business Wire, Jun. 10, 2003, [online] Retrieved from the Internet: URL: http://www.the freelibrary.com/_/print/PrintArticle.aspx?id=102949279, 2 pages.
"Basis100 Partners to Offer Automated Valuation Service," Canada StockWatch, Jan. 27, 2004, 2 pages.
"Basis100 Partners with First American," PR Newswire, Jan. 27, 2004, 3 pages.
"Casa(TM) to Value More Than $100 Billion of Residential Real Estate in 2001—Leading Lenders Saving Big without Compromising Loan Quality," PR Newswire, May 21, 2001, 3 pages.
"Centre for Mathematical Sciences," Lund University, http://web.archive.org/web/200600101005103/http://www.maths.lth.se/, [internet archive date Jan. 1, 2006], 1 page.
"Directory of Valuation Providers, Your Source for Valuation Information," Zackin Publications Inc., 2004, 5 pages.
"First American Expands Real Estate Valuation Line, Aims to Increase Accuracy with Addition of Veros, Basis100 AVMs," Inman News, Mar. 15, 2004, 2 pages.
"First American Real Estate Solutions Experiences Record," PR Newswire, Nov. 4, 2002, 3 pages.
"First American Real Estate Solutions Releases ValuePoint4," PR Newswire, Oct. 21, 2002, 3 pages.
"First American Real Estate Solutions' ValuePoint(R)4 Experiences Explosive Growth in 2004—Leading Automated Valuation Model (AVM) Usage Grows More Than 700 Percent in 12-Month Period," PR Newswire, Mar. 24, 2005, 3 pages.
"Franchise Offering Circular for Prospective Franchisees," U.S. Appraisal, Nov. 1, 1986, 87 pages.
"GMAC-RFC Selects First American Real Estate Solutions' ValuePoint(R)4 Automated Valuation Model (AVM)," PR Newswire, Jun. 28, 2004, 3 pages.
"HNC Software And RealQuest Team to Provide Widespread Automated Property Valuation; AREAS Users to Have Online Access to Texas MLS," Business Wire, Oct. 1, 1997, 3 pages.
"HomeAdvisor Ranks First In Gomez Poll," Realty Times, Jun. 13, 2001, 3 pages.
"HomeAdvisor Spin-Off Aims to Service Realty Industry," Directions on Microsoft, Apr. 24, 2000, 2 pages.
"HomeSeekers.com and MSN HomeAdvisor Provide Free Web Pages For All Real Estate Agents," PR Newswire, May 20, 1999, 3 pages.
"How do we value your home?," [online] CSWOnline, Retrieved from the Internet via the Wayback Machine dated Oct. 23, 1999, URL: http://w w w .csw online.com/method.shtml, 1 page.
"In Brief: HomeAdvisor Secures $100 Million in Equity Funding," Directions on Microsoft, Aug. 28, 2000, 1 page.
"Microsoft Real Estate Venture Gets Large Investment," The New York Times, Technology section, Aug. 23, 2000, 2 pages.
"MSN HomeAdvisor Becomes Most-Visited Home and Real Estate Web Site, According to Media Metrix," Microsoft News Center, Apr. 13, 2001, Retrieved from the Internet: URL: http://www.microsoft.com/enus/ news/press/2001/Apr01/04-13MarchTrafficPR.aspx?navV3Index=0, 2 pages.
"MSN HomeAdvisor Helps Real Estate Agents and Customers Feel Right at Home on the Internet," Microsoft News Center, Dec. 14, 1998, Retrieved from the Internet: URL: http://www.microsoft.com/enus/ news/features/1998/12-14msn.aspx?navV3Index=0, 2 pages.
"Nation's First Fully Interactive AVM Debuts in Las Vegas AVM News," PRweb press release, AVM News, Feb. 4, 2006, 1 page.
"NetNumina Solutions Creates Robust E-Business Solution for Leader in Real Estate Lending," PR Newswire, Aug. 16, 1999, 3 pages.
"Reis Inc.," Commercial Property News, vol. 18, Issue 6, Mar. 16, 2004, 2 pages.
"Reis, Inc. Launches Apartment Version of Online Valuation and Credit Risk Analysis Module," Business Wire, Nov. 7, 2002, 2 pages.
"RMBS: Guidelines for the Use of Automated Valuation Models for U.K. RMBS Transactions," Standard and Poors.com [online], Sep. 26, 2005 [retrieved Aug. 6, 2013], Retrieved from the Internet, S&P Archive: URL: www.standardandpoors.com/prot/ratings/articles/en/us/?articleType=HTML&assetID=1245330509010, 4 pages.
"Sample CASA Report," [online] CSWOnline, Retrieved from the Internet via the Wayback Machine dated Nov. 6, 1999, URL: http://w w w .csw online.com/sample.shtml, 3 pages.
"Standard on Automated Valuation Models (AVMs)", International Association of Assessing Officers, Approved Sep. 2003, 36 pages.
"The Appraisal" Report, U.S. Appraisal, dated at least by Sep. 29, 1983, 4 pages.
"The Appraiser," Certificate of Copyright Registration, Jun. 25, 1982, 4 pages.
"The Appraiser," Certificate of Copyright Registration, Oct. 19, 1981, 3 pages.
"The Assessor" Demo Video, U.S. Appraisal, [Accessed for review on Jun. 21, 2013, *Zillow Inc.* vs. *Trulia* Case No. 2:12-cv-01549-JLR], [Transcribed Oct. 8, 2013], 10 pages.
"The Assessor" Newsletter, US Appraisal, dated at least by Apr. 10, 1985, 4 pages.
"The Assessor" Source Code, U.S. Appraisal, [Accessed for review on Jun. 21, 2013, *Zillow Inc.* vs. *Trulia* Case No. 2:12-cv-01549-JLR], 2,460 pages.
"The Assessor," Certificate of Copyright Registration, Feb. 2, 1984, 2 pages.
"The Comprehensive R Archive Network,", www.cran.r-project.org, http://web.archive.org/web/20050830073913/cran.r-project.org/banner.shtml, [internet archive date: Aug. 30, 2005], pp. 1-2.
"The R Project for Statistical Computing," www.r-project.org, http://web.archive.org/web/20060102073515/www.r-project.org/main.shtml, [internet archive date: Jan. 2, 2006], 1 page.
"TransUnion Acquires Banton Technologies," PR Newswire, Oct. 20, 2003, 3 pages.
"TransUnion and CSW Form Partnership," Mortgage Banking, vol. 62, Issue 6, Mar. 31, 2002, 1 page.
"Trulia Estimates," [online], Retrieved from the Internet via the Wayback Machine dated Jan. 16, 2013, URL:http//www.trulia.com/trulia_estimates/, 2 pages.
"Uniform Standards of Professional Appraisal Practice and Advisory Opinions 2005 Edition<" Electronic USPAP 2005 Edition, Appraisal Standards Board, The Appraisal Foundation, Effective Jan. 1, 2005, 10 pages.
"USPAP Q&A," vol. 9, No. 6, The Appraisal Foundation, Jun. 2007, 2 pages.
"What Is an AVM?", Real-Info.com [online], Dec. 22, 2005 [retrieved on Aug. 6, 2013], Retrieved from the Internet via Internet Archive Wayback Machine: URL: web.archive.org/web/20051222120807/http://www.real-info.com/products_avm.asp?RISID=e8fc23a9a1189fbff9b9b8e8f86ccde6], 3 pages.
Xactware Unveils Web-Based Valuation Tool for Underwriting, PR Newswire, Dec. 10, 2002, 3 pages.
"Xactware. (Central Utah)," Utah Business, vol. 17, Issue 3, Mar. 1, 2003, 1 page.
Appeal Brief for U.S. Appl. No. 11/524,048, filed Aug. 9, 2010, 20 pages.
Archer, W.R. et al., "Measuring the Importance of Location in House Price Appreciation", J. of Urban Economics, vol. 40, 1996, pp. 334-353, accessible at https://www.sciencedirect.com/science/article/pii/S0094119096900364 (accessed Feb. 26, 2018). (Year: 1996).

(56) References Cited

OTHER PUBLICATIONS

Assignment of Copyright to U.S. Appraisal by Flying Software, Inc., Jan. 2, 1982, 2 pages.
Australian Examiner's First Report in Australian Patent Application 2007216858, dated Dec. 22, 2008, 2 pages.
AVM News, Thomson Media, vol. 1, Issue Jan. 1, 2002, 23 pages.
AVM News, Thomson Media, vol. 1, Issue 10, Oct. 2002, 34 pages.
AVM News, Thomson Media, vol. 1, Issue 11, Nov. 2002, 28 pages.
AVM News, Thomson Media, vol. 1, Issue 12, Dec. 2002, 14 pages.
AVM News, Thomson Media, vol. 1, Issue 2, Feb. 2002, 13 pages.
AVM News, Thomson Media, vol. 1, Issue 3, Mar. 2002, 21 pages.
AVM News, Thomson Media, vol. 1, Issue 4, Apr. 2002, 24 pages.
AVM News, Thomson Media, vol. 1, Issue 5, May 2002, 35 pages.
AVM News, Thomson Media, vol. 1, Issue 6, Jun. 2002, 19 pages.
AVM News, Thomson Media, vol. 1, Issue 7, Jul. 2002, 24 pages.
AVM News, Thomson Media, vol. 1, Issue 8, Aug. 2002, 17 pages.
AVM News, Thomson Media, vol. 1, Issue 9, Sep. 2002, 15 pages.
AVM News, Thomson Media, vol. 10, Issue 11-12, Nov.-Dec. 2011, 70 pages.
AVM News, Thomson Media, vol. 10, Issue 1-2, Jan.-Feb. 2011, 72 pages.
AVM News, Thomson Media, vol. 10, Issue 3-4, Mar.-Apr. 2011, 100 pages.
AVM News, Thomson Media, vol. 10, Issue 5-6, May-Jun. 2011, 106 pages.
AVM News, Thomson Media, vol. 10, Issue 7-8, Jul.-Aug. 2011, 82 pages.
AVM News, Thomson Media, vol. 10, Issue 9-10, Sep.-Oct. 2011, 90 pages.
AVM News, Thomson Media, vol. 11, Issue 1-2, Jan.-Feb. 2012, 66 pages.
AVM News, Thomson Media, vol. 11, Issue 3-4, Mar.-Apr. 2012, 76 pages.
AVM News, Thomson Media, vol. 11, Issue 5-6, May-Jun. 2012, 72 pages.
AVM News, Thomson Media, vol. 2, Issue 1, Jan. 2003, 24 pages.
AVM News, Thomson Media, vol. 2, Issue 10, Oct. 2003, 31 pages.
AVM News, Thomson Media, vol. 2, Issue 11, Nov. 2003, 28 pages.
AVM News, Thomson Media, vol. 2, Issue 12, Dec. 2003, 18 pages.
AVM News, Thomson Media, vol. 2, Issue 2, Feb. 2003, 26 pages.
AVM News, Thomson Media, vol. 2, Issue 3, Mar. 2003, 29 pages.
AVM News, Thomson Media, vol. 2, Issue 4, Apr. 2003, 22 pages.
AVM News, Thomson Media, vol. 2, Issue 5, May 2003, 33 pages.
AVM News, Thomson Media, vol. 2, Issue 6, Jun. 2003, 38 pages.
AVM News, Thomson Media, vol. 2, Issue 7, Jul. 2003, 31 pages.
AVM News, Thomson Media, vol. 2, Issue 8, Aug. 2003, 24 pages.
AVM News, Thomson Media, vol. 2, Issue 9, Sep. 2003, 30 pages.
AVM News, Thomson Media, vol. 3, Issue 1, Jan. 2004, 24 pages.
AVM News, Thomson Media, vol. 3, Issue 10, Oct. 2004, 55 pages.
AVM News, Thomson Media, vol. 3, Issue 11, Nov. 2004, 54 pages.
AVM News, Thomson Media, vol. 3, Issue 12, Dec. 2004, 18 pages.
AVM News, Thomson Media, vol. 3, Issue 2, Feb. 2004, 26 pages.
AVM News, Thomson Media, vol. 3, Issue 3, Mar. 2004, 31 pages.
AVM News, Thomson Media, vol. 3, Issue 4, Apr. 2004, 36 pages.
AVM News, Thomson Media, vol. 3, Issue 5, May 2004, 37 pages.
AVM News, Thomson Media, vol. 3, Issue 6, Jun. 2004, 35 pages.
AVM News, Thomson Media, vol. 3, Issue 7, Jul. 2004, 49 pages.
AVM News, Thomson Media, vol. 3, Issue 8, Aug. 2004, 37 pages.
AVM News, Thomson Media, vol. 3, Issue 9, Sep. 2004, 31 pages.
AVM News, Thomson Media, vol. 4, Issue 1, Jan. 2005, 45 pages.
AVM News, Thomson Media, vol. 4, Issue 10, Oct. 2005, 51 pages.
AVM News, Thomson Media, vol. 4, Issue 11, Nov. 2005, 52 pages.
AVM News, Thomson Media, vol. 4, Issue 12, Dec. 2005, 56 pages.
AVM News, Thomson Media, vol. 4, Issue 2, Feb. 2005, 31 pages.
AVM News, Thomson Media, vol. 4, Issue 3, Mar. 2005, 39 pages.
AVM News, Thomson Media, vol. 4, Issue 4, Apr. 2005, 40 pages.
AVM News, Thomson Media, vol. 4, Issue 5, May 2005, 51 pages.
AVM News, Thomson Media, vol. 4, Issue 6, Jun. 2005, 34 pages.
AVM News, Thomson Media, vol. 4, Issue 7, Jul. 2005, 53 pages.
AVM News, Thomson Media, vol. 4, Issue 8, Aug. 2005, 30 pages.
AVM News, Thomson Media, vol. 4, Issue 9, Sep. 2005, 48 pages.
AVM News, Thomson Media, vol. 5, Issue 1, Jan. 2006, 58 pages.
AVM News, Thomson Media, vol. 5, Issue 10, Oct. 2006, 85 pages.
AVM News, Thomson Media, vol. 5, Issue 11, Nov. 2006, 86 pages.
AVM News, Thomson Media, vol. 5, Issue 12, Dec. 2006, 54 pages.
AVM News, Thomson Media, vol. 5, Issue 2, Feb. 2006, 53 pages.
AVM News, Thomson Media, vol. 5, Issue 3, Mar. 2006, 41 pages.
AVM News, Thomson Media, vol. 5, Issue 4, Apr. 2006, 54 pages.
AVM News, Thomson Media, vol. 5, Issue 5, May 2006, 48 pages.
AVM News, Thomson Media, vol. 5, Issue 6, Jun. 2006, 62 pages.
AVM News, Thomson Media, vol. 5, Issue 7, Jul. 2006, 74 pages.
AVM News, Thomson Media, vol. 5, Issue 8, Aug. 2006, 57 pages.
AVM News, Thomson Media, vol. 5, Issue 9, Sep. 2006, 63 pages.
AVM News, Thomson Media, vol. 6 Issue 3, Mar. 2007, 49 pages.
AVM News, Thomson Media, vol. 6, Issue 1, Jan. 2007, 42 pages.
AVM News, Thomson Media, vol. 6, Issue 10, Oct. 2007, 52 pages.
AVM News, Thomson Media, vol. 6, Issue 11, Nov. 2007, 23 pages.
AVM News, Thomson Media, vol. 6, Issue 2, Feb. 2007, 47 pages.
AVM News, Thomson Media, vol. 6, Issue 4, Apr. 2007, 59 pages.
AVM News, Thomson Media, vol. 6, Issue 5, May 2007, 66 pages.
AVM News, Thomson Media, vol. 6, Issue 6, Dec. 2007, 38 pages.
AVM News, Thomson Media, vol. 6, Issue 6, Jun. 2007, 46 pages.
AVM News, Thomson Media, vol. 6, Issue 8, Aug. 2007, 35 pages.
AVM News, Thomson Media, vol. 6, Issue 9, Sep. 2007, 37 pages.
AVM News, Thomson Media, vol. 6, Issue7, Jul. 2007, 51 pages.
AVM News, Thomson Media, vol. 7, Issue 07-08, Jul.-Aug. 2008, 56 pages.
AVM News, Thomson Media, vol. 7, Issue 1, Jan. 2008, 44 pages.
AVM News, Thomson Media, vol. 7, Issue 11-12, Nov.-Dec. 2008, 52 pages.
AVM News, Thomson Media, vol. 7, Issue 2, Feb. 2008, 35 pages.
AVM News, Thomson Media, vol. 7, Issue 3, Mar. 2008, 34 pages.
AVM News, Thomson Media, vol. 7, Issue 4, Apr. 2008, 33 pages.
AVM News, Thomson Media, vol. 7, Issue 4-5, May-Jun. 2008, 46 pages.
AVM News, Thomson Media, vol. 7, Issue 9-10, Sep.-Oct. 2008, 68 pages.
AVM News, Thomson Media, vol. 8, Issue 11-12, Nov.-Dec. 2009, 62 pages.
AVM News, Thomson Media, vol. 8, Issue 1-2, Jan.-Feb. 2009, 71 pages.
AVM News, Thomson Media, vol. 8, Issue 3-4, Mar.-Apr. 2009, 45 pages.
AVM News, Thomson Media, vol. 8, Issue 5-6, May-Jun. 2009, 65 pages.
AVM News, Thomson Media, vol. 8, Issue 7-8, Jul.-Aug. 2009, 71 pages.
AVM News, Thomson Media, vol. 8, Issue 9-10, Sep.-Oct. 2009, 53 pages.
AVM News, Thomson Media, vol. 9, Issue 11-12, Nov.-Dec. 2010, 75 pages.
AVM News, Thomson Media, vol. 9, Issue 1-2, Jan.-Feb. 2010, 66 pages.
AVM News, Thomson Media, vol. 9, Issue 3-4, Mar.-Apr. 2010, 63 pages.
AVM News, Thomson Media, vol. 9, Issue 5-6, May-Jun. 2010, 69 pages.
AVM News, Thomson Media, vol. 9, Issue 7-8, Jul.-Aug. 2010, 63 pages.
AVM News, Thomson Media, vol. 9, Issue 9-10, Sep.-Oct. 2010, 69 pages.
Bailey, Martin J. et al., A Regression Method for Real Estate Price Index Construction, Journal of the American Statistical Association, vol. 58, No. 304 (Dec. 1963), Published by: American Statistical Association, Stable URL: http://www.jstor.org/stable/2283324, pp. 933-942, 11 pages.
Basch, Mark, "Basis100 Sold to California Firm," The Florida Times Union, Jacksonville.com, Jul. 1, 2004, 2 pages.
Bennett, Kristin P et al . . . , "Support Vector Machines: Hype or Hallelujah?" SIGKDD Explorations, Dec. 2000, , vol. 2, issue 2, ACM SIGKDD, 13 pages.

(56) References Cited

OTHER PUBLICATIONS

Beracha, E., et al., "The Rent versus Buy Decision: Investigating the Needed Property Appreciation Rates to be Indifferent between Renting and Buying Property." Journal of Real Estate Practice and Education, 15(2), 71-88.
Borst, Richard A. et al., "An Evaluation of Multiple Regression Analysis, Comparable Sales Analysis and Artificial Neural Networks for the Mass Appraisal of Residential Properties in Northern Ireland," 1996, 16 pages.
Borst, Richard A. et al., "Use of GIS to Establish and Update CAMA Neighborhoods in Northern Ireland," Available prior to Sep. 1997, 9 pages.
Borst, Richard A., "A Valuation and Value Updating of Geographically Diverse Commercial Properties Using Artificial Neural Networks," 1993, 2 pages.
Borst, Richard A., "Computer Assisted Mass Appraisal, A New Growth Industry in the United States," Accessed from International Association of Assessing Officers Research and Technical Services Department, Document 00994, Dated no later than Jun. 8, 1979, 28 pages.
Borst, Richard A., "The Common Thread in Market Data Systems," World Congress on Computer-Assisted Valuation, Aug. 1-6, 1982, 14 pages.
Boston Housing Data, http://www.ics.uci.edu/~mlearn/databases/housing/housing.names, [accessed Dec. 13, 2005], 1 page.
Breiman et al., "Random Forest," Classification Description, http://www.stat.berkeley.edu/users/breiman/RandomForests/cc_home.htm, [accessed Dec. 13, 2005], pp. 1-28.
Breiman, L., "Random Forests," Machine Learning, 45, 2001, Kluwer Academic Publishers, The Netherlands, pp. 5-32.
Breiman, Leo et al., Random Forests, R Mathematical Software Package, licensed by Salford Systems, available at URL cran.r-project.org, and described at "Package 'randomForest'", version 4.6-7, Feb. 15, 2013, Published Oct. 16, 2012, available at URL cran.r-project.org/web/packages/randomforest/randomForest.pdf., 29 pages.
Calhoun, Charles A., "Property Valuation Methods and Data in the United States," Housing Finance International Journal 16.2, Dec. 2001, pp. 12-23.
Campbell, "Forced Sales and House Prices", 101 American Economic Review 2108, pp. 2108-2131, Aug. 2011.
Casa Property Valuation screen capture, dated at least by Jan. 24, 2005, 1 page.
Case, Karl E., et al., "Prices of Single Family Homes Since 1970: New Indexes for Four Cities," Cowles Foundation for Research in Economics at Yale University, New Haven, Connecticut, Discussion Paper No. 851, Oct. 1987, 54 pages.
CDR Business Solutions, LLC, What is RELAR, <http://www.relar.com/relarsystem.aspx> Aug. 24, 2011, Archived by Internet Wayback Machine <http://web.archive.org/web/20110824084613/http://www.relar.com/relarsystem.aspx> viewed Aug. 20, 2015, pp. 1-4.
Centre for Mathematical Sciences, Lund University, "Classification and Regression with Random Forest," http://web.archive.org/web/20060205051957/http://www.maths.lth.se/help/R/.R/library/randomForest/html/randomForest.html, [internet archive date: Feb. 5, 2006], pp. 1-4.
Clauretie, "Estimating the House Foreclosure Discount Corrected for Spatial Price Interdependence and Endogeneity of Marketing Time", 37 Real Estate Economics 43, pp. 44-48, 2009.
Complaint for Patent Infringement, Demand for Jury Trial for U.S. Pat. No. 7,970,674, Case 2:12-cv-01549-JLR, Sep. 12, 2012, 8 pages.
Cozzi, Guy, Real Estate Appraising from A to Z, 4th Edition, Nemmar Real Estate Training, Jan. 1, 2002, 226 pages, Parts 1-2.
Crowston, Kevin, et al., "Real Estate War in Cyberspace: An Emerging Electronic Market?," Syracuse University Surface, School of Information Studies (iSchool), Jan. 1, 1999, 14 pages.
Curriculum Vitae of Steven R. Kursh, Ph.D., CSDP, CLP, Aug. 2013, 9 pages.
Cypress Software Introduces AVM Module for Mark IV Application; Module Provides Instant Home Appraisal for Loans Processed by the Loan-Decisioning Platform, Business Wire, Nov. 15, 2005, 2 pages.
Decision—Institution of Covered Business Method Patent Review for U.S. Pat. No. 7,970,674, Case CBM2013-00056, Entered Mar. 10, 2014, 36 pages.
Decision—Institution of Inter Partes Review for U.S. Pat. No. 7,970,674, Case No. IPR2013-00034, Apr. 2, 2013, 28 pages.
Decision on Appeal for U.S. Appl. No. 11/524,048, mailing date Oct. 19, 2012, 7 pages.
Decision on Request for Rehearing for U.S. Pat. No. 7,970,674, Case No. IPR2013-00034, Apr. 22, 2013, 5 pages.
Declaration Brooke A.M. Taylor in Support of Plaintiff Vasudevan Software, Inc.'s Motion for Sanctions Against Microstrategy, Case No. 3:11-06637-RS-PSG, Nov. 20, 2012, 3 pages.
Declaration of Dr. Richard Borst, Aug. 26, 2013, 43 pages.
Declaration of John Kilpatrick, Case No. IPR2013-00034, Jun. 14, 2013, 23 pages.
Declaration of Jordan Connors in Support of Plaintiff Vasudevan Software, Inc.'s Motion for Sanctions Against Microstraqtegy, Case No. 3:11-06637-RS-PSG, Nov. 20, 2012, 4 pages.
Declaration of Leslie V. Payne in Support of Plaintiff Vasudevan Software, Inc.'s Motion for Sanctions Against Microstrategy, Case No. 3:11-06637-RS-PSG, Nov. 20, 2012, 3 pages.
Declaration of Steven R. Kursh, Ph.D., CSDP, CLP, CBM 2013-00056, Filed Sep. 11, 2013, 108 pages.
Declaration of Steven R. Kursh, Ph.D., CSDP, CLP, CBM2014-00115, Filed Apr. 10, 2014, 108 pages.
Defendant Trulia, Inc.'s Answer to Complaint for Patent Infringement and Counterclaim, Demand for Jury Trial, Case No. 2:12-cv-01549-JLR, Mar. 1, 2013, 10 pages.
Defendant Trulia, Inc.'s Non-Infringement and Invalidity Contentions, Case No. 2:12-cv-01549-JLR, Jun. 21, 2013, 24 pages.
Defendant Trulia, Inc.'s Non-Infringement and Invalidity Contentions, Exhibit A, Case No. 2:12-cv-01549-JLR, Jun. 21, 2013, 267 pages.
Dempster, A.P. et al., "Maximum Likelihood from Incomplete Data via the Algorithm," Journal of the Royal Statistical Society, 1977, Series B 39 (1): 1-38, JSTOR 2984875, MR 0501537, [online], Retrieved from the Internet: URL: http://www.jstor.org/stable/2984875?origin=JSTOR-pdf, 38 pages.
Department of the Treasury, Internal Revenue Service, "How to Depreciate Property," Publication 946, made available at www.irs.gov by dated at least 2004, 112 pages.
Deposition Transcription of John A. Kilpatrick, Ph.D., Aug. 8, 2013, 263 pages.
Earner, M., "ZipRealty and Redfin Integrate with Zillow's API," via the Wayback Machine as published on Oct. 23, 2006.
European Examination Report, Application No. 07018380.1, dated May 16, 2013, 6 pages.
European Examination Report, Application No. 07018380.1, dated Oct. 24, 2008, 6 pages.
European Examination Report, Application No. 07018380.1, dated Nov. 8, 2012, 6 pages.
Evaluation Services, Inc. Warranty to Lender's Service, Inc., dated at least by Feb. 12, 1997, 144 pages.
Evans, Blanche, "Microsoft HomeAdvisor: Software Giant, Real Estate Portal," Realty Times, Mar. 30, 2000, 3 pages.
Evans, Blanche, The Hottest E-careers in Real Estate, Dearborn Financial Publishing Inc., 2000, 241 pages.
Examiner's Answer for U.S. Appl. No. 11/524,048, dated Oct. 28, 2010, 13 pages.
Fannie Mae Form 2055, Federal National Mortgage Association [online], Mar. 2005, Retrieved from the Internet: URL: https://www.fanniemae.com/content/guide_form/2055.pdf, 8 pages.
Fannie Mae Form 2075, Desktop Underwriter Property Inspection Report, Federal National Mortgage Association [online], not dated, Retrieved from the Internet: URL: https://www.fanniemae.com/content/guide_form/2075.pdf, 3 pages.
Feldman, David et al., "Mortgage Default: Classification Trees Analysis," The Pinhas Sapir Center for Development Tel-Aviv University, Discussion Paper No. Mar. 2003, Oct. 2003, 46 pages.

(56) References Cited

OTHER PUBLICATIONS

FHFA, "Distress-Free House Price Indexes." https://www.fhfa.gov/DataTools/Downloads/Documents/HPI_Focus_Pieces/2012Q2_HPI_N508.pdf. Jul. 13, 2014.
File History of U.S. Pat. No. 7,970,674, dated Mar. 3, 2006-Apr. 2, 2013, 404 pages, Parts 1-4.
Final Office Action for U.S. Appl. No. 13/843,577, dated Oct. 6, 2017, 83 pages.
Final Office Action for U.S. Appl. No. 14/041,450, dated Apr. 6, 2017, 47 pages.
Final Office Action for U.S. Appl. No. 14/041,450, dated Sep. 24, 2019, 22 pages.
Final Office Action for U.S. Appl. No. 14/078,076, dated Feb. 26, 2016, 21 pages.
Final Office Action for U.S. Appl. No. 11/347,000, dated Jan. 3, 2012, 17 pages.
Final Office Action for U.S. Appl. No. 11/347,024, dated Feb. 3, 2011, 28 pages.
Final Office Action for U.S. Appl. No. 15/698,276, dated Apr. 9, 2020, 32 pages.
Final Office Action for U.S. Appl. No. 14/846,632, dated May 7, 2020; 22 pages.
Final Office Action for U.S. Appl. No. 16/235,009, dated Jul. 13, 2020; 21 pages.
Final Office Action for U.S. Appl. No. 11/524,047, dated Jun. 12, 2015, 31 pages.
Final Office Action for U.S. Appl. No. 11/524,047, dated Jul. 23, 2010, 7 pages.
Final Office Action for U.S. Appl. No. 11/524,047, dated Sep. 28, 2012, 8 pages.
Final Office Action for U.S. Appl. No. 11/524,048, dated Dec. 8, 2009, 11 pages.
Final Office Action for U.S. Appl. No. 11/927,623, dated Nov. 3, 2016, 15 pages.
Final Office Action for U.S. Appl. No. 12/924,037, dated Jun. 7, 2018, 19 pages.
Final Office Action for U.S. Appl. No. 12/924,037, dated Jun. 19, 2017, 25 pages.
Final Office Action for U.S. Appl. No. 12/924,037, dated May 16, 2013, 11 pages.
Final Office Action for U.S. Appl. No. 12/924,037, dated Jun. 16, 2015, 19 pages.
Final Office Action for U.S. Appl. No. 13/044,480, dated Feb. 19, 2014, 31 pages.
Final Office Action for U.S. Appl. No. 13/044,480, dated Jun. 12, 2017, 55 pages.
Final Office Action for U.S. Appl. No. 13/044,480, dated Jul. 10, 2015, 35 pages.
Final Office Action for U.S. Appl. No. 13/044,480, dated Dec. 14, 2018, 35 pages.
Final Office Action for U.S. Appl. No. 13/044,490, dated Mar. 14, 2013, 35 pages.
Final Office Action for U.S. Appl. No. 13/044,490, dated Mar. 29, 2017, 7 pages.
Final Office Action for U.S. Appl. No. 13/044,490, dated May 7, 2015, 36 pages.
Final Office Action for U.S. Appl. No. 13/417,804, dated Aug. 13, 2014, 14 pages.
Final Office Action for U.S. Appl. No. 13/417,804, dated Oct. 14, 2015, 11 pages.
Final Office Action for U.S. Appl. No. 13/828,680, dated Jul. 11, 2018, 59 pages.
Final Office Action for U.S. Appl. No. 13/828,680, dated Jul. 26, 2016, 59 pages.
Final Office Action for U.S. Appl. No. 13/828,680, dated Jan. 3, 2020, 60 pages.
Final Office Action for U.S. Appl. No. 13/830,497, dated Jun. 8, 2017, 57 pages.
Final Office Action for U.S. Appl. No. 13/843,577, dated Mar. 22, 2016, 63 pages.
Final Office Action for U.S. Appl. No. 13/943,604, dated Mar. 6, 2015, 28 pages.
Final Office Action for U.S. Appl. No. 14/041,450, dated Jun. 29, 2018, 14 pages.
Final Office Action for U.S. Appl. No. 14/078,076, dated Jul. 27, 2017, 32 pages.
Final Office Action for U.S. Appl. No. 14/167,962, dated Sep. 30, 2015, 13 pages.
Final Office Action for U.S. Appl. No. 16/125,318, dated Aug. 25, 2020, 25 pages.
Final Office Action for U.S. Appl. No. 15/789,617, dated Sep. 3, 2020, 45 pages.
Final Office Action for U.S. Appl. No. 14/167,962, dated Nov. 9, 2017, 23 pages.
Final Office Action for U.S. Appl. No. 14/191,388, dated Dec. 15, 2014, 12 pages.
Final Office Action for U.S. Appl. No. 14/318,536, dated Dec. 11, 2014, 47 pages.
Final Office Action for U.S. Appl. No. 14/325,094, dated Jun. 5, 2018, 81 pages.
Final Office Action for U.S. Appl. No. 14/325,094, dated Jun. 7, 2019, 58 pages.
Final Office Action for U.S. Appl. No. 14/325,094, dated Apr. 22, 2020, 53 pages.
Final Office Action for U.S. Appl. No. 14/524,148, dated Mar. 9, 2020, 62 pages.
Final Office Action for U.S. Appl. No. 14/524,148, dated Jul. 19, 2018, 54 pages.
Final Office Action for U.S. Appl. No. 14/640,860, dated Oct. 23, 2018, 85 pages.
Final Office Action for U.S. Appl. No. 14/640,860, dated Apr. 14, 2020, 85 pages.
Final Office Action for U.S. Appl. No. 14/704,567, dated May 1, 2018, 24 pages.
Final Office Action for U.S. Appl. No. 14/709,719, dated Aug. 3, 2018, 27 pages.
Final Office Action for U.S. Appl. No. 14/709,719, dated Dec. 2, 2019, 35 pages.
Final Office Action for U.S. Appl. No. 14/721,437, dated Nov. 9, 2018, 84 pages.
Final Office Action for U.S. Appl. No. 14/721,437, dated Apr. 16, 2020, 103 pages.
Final Office Action for U.S. Appl. No. 14/846,632, dated Jun. 11, 2018, 16 pages.
Final Office Action for U.S. Appl. No. 14/846,632, dated Aug. 6, 2019, 16 pages.
Final Office Action for U.S. Appl. No. 11/927,623, dated Jun. 14, 2019, 18 pages.
Final Office Action for U.S. Appl. No. 11/927,623, dated Sep. 19, 2011, 13 pages.
Final Office Action for U.S. Appl. No. 11/927,623, dated Jun. 12, 2020, 15 pages.
Final Written Decision for U.S. Pat. No. 7,970,674, Case IPR2013-00034, Entered Mar. 27, 2014, 44 pages.
Finkelstein, Brad, "PlatinumData Improving Value of Its Information," Origination News and SourceMedia, Inc., vol. 15, Section: Special Report, Section:2, Nov. 1, 2005, 2 pages.
First American Real Estate Solutions Releases ValuePoint4, AVM News, Thomson Media, vol. 1, Issue 10, Oct. 2002, pp. 28-29.
Fletcher, June, "High-Tech Is Coming for High-End House Sales," Wall Street Journal, Sep. 19, 1997, 1 page.
Fletcher, June, "On the Web: What's Your House Worth?," Wall Street Journal, Sep. 26, 1997, 1 page.
Fletcher, June, "Touring the Tangled Web of For-Sale-by-Owner Homes," The Wall Street Journal, Jun. 6, 1997, 1 page.
Freddie Mac Form 70, Uniform Residential Appraisal Report, Federal Home Loan Mortgage Corporation [online], Mar. 2005, Retrieved from the Internet: URL: https://www.fanniemae.com/content/guide_form/1004.pdf, 8 pages.
Freddie Mac's Home Value Explorer screen capture, dated at least by Jul. 15, 2003, 1 page.
Gelfand, A.E. et al., "The Dynamics of Location in Home Price," J. of Real Estate Fin. and Econ., vol. 29:2, 2004, pp. 149-166,

(56) References Cited

OTHER PUBLICATIONS accessible at https://link.springer.com/content/pdf/10.1023%2FB%3AREAL.0000035308.15346.0a.pdf (accessed Feb. 26, 2018). (Year: 2004).
Google, Google Trends, retrieved from the internet Oct. 12, 2015 <http://www.google.com/trends> (website address only—No document).
Great Britain Examination Report in Application No. GB0701944.1, dated May 5, 2010, 3 pages.
Great Britain Search Report for GB0701944.1, dated Mar. 23, 2007, 3 pages.
Gudell, Svenja, "One More Advance in Creating a Better Price-to-Rent Ratio", retrieved from the Internet, URL: https://www.zillow.com/research/one-more-advance-in-creating-a-better-price-to-rent-ratio-2968, Jul. 27, 2012, 4 pages.
Hill, T. and Lewicki, P., "K-Nearest Neighbors," Statistics Methods and Applications, 2007, http://www.statsoft.com/textbook/stknn.html, [internet accessed on [Dec. 6, 2007], 5 pages.
Hochgraf, Lisa, "Tools for Top Speed," Credit Union Management, vol. 26, Issue 8, Aug. 1, 2003, 4 pages.
HomeSearch Report, [online], Retrieved from the Internet via the Wayback Machine dated Dec. 10, 2005 on Jun. 19, 2013, URL: http://homesmartreports.com/samples/samplehomesearch.htm, 3 pages.
HomeSmart About, [online], Retrieved from the Internet via the Wayback Machine dated Dec. 10, 2005 http://homesmartreports.com/hs_about.htm, 2 pages.
HomeSmart Reports, [online], Retrieved from the Internet via the Wayback Machine dated Dec. 10, 2005 on Jun. 19, 2013, URL: http://homesmartreports.com/default.aspx, 1 page.
HomeSmart Sellers, [online], Retrieved from the Internet via the Wayback Machine dated Dec. 10, 2005 on Jun. 19, 2013, URL: http://homesmartreports.com/hs_owners.htm, 1 page.
HomeSmart Terms of Use, [online], Retrieved from the Internet via the Wayback Machine dated Dec. 10, 2005 on Jun. 19, 2013, URL: http://homesmartreports.com/hs_disclaimer.htm, 3 pages.
Homesmartreports, [online], Retrieved from the Internet via the Wayback Machine dated Oct. 13, 2005 on Jun. 19, 2013, URL: http://homesmartreports.com/, 2 pages.
Humphries, S., "Foreclosure Liquidations Abate in the Fourth Quarter But At the Expense of Number of Homes Underwater," Zillow Research, Feb. 8, 2011, 3 pages.
Igan et al., "Global Housing Cycles," IMF Working Paper, Aug. 2012, pp. 1-55.
Indeed, Job Trends: Podcast, retrieved from the internet Oct. 12, 2015 <http://www.indeed.com/jobtrends> (website only—No document).
Infinite Regression, Certificate of Copyright Registration Filing, Apr. 2, 1984, 3 pages.
Inman, "Zilpy, the new 'Z' site in online real estate", published Feb. 7, 2008, retrieved from http://www.inman.com/2008/02/07/zilpy-new-z-site-in-online-real-estate/ on Aug. 11, 2016, 2 pages.
Jensen, David L., "Alternative Modeling Techniques in Computer-Assisted Mass Appraisal," Property Tax Journal, vol. 6, No. 3, Sep. 1987, pp. 193-237.
Jobster, Job Search Trends for Keywords and Locations, retrieved from the internet Oct. 12, 2015 <http://www.jobster.com/find/US/jon/search/trends> (website only—No document).
John Battelle's Searchblog,: The Database of Intentions, Nov. 13, 2003.
Kilpatrick, John A., "The Future Of Real Estate Information," Real Estate Issues, Spring 2001, 8 pages.
Kilpatrick, John A., et al., "House Price Impacts of School District Choice," South Carolina Center for Applied Real Estate Education and Research, Dec. 28, 1998, 25 pages.
Kottle, M.L., Zillow traffic up after shift; site known for real estate prices decided to add for-sale listings. San Francisco Chronicle.
Krasilovsky, Peter, "Chris Terrill Discusses ServiceMagic's Rebranding to 'Home Advisor,'" Home Advisor, Oct. 17, 2012, 5 pages.
Lankarge, Vicki, et al., How to Increase the Value of Your Home: Simple, Budget-Conscious Techniques and Ideas That Will Make Your Home Worth Up to $100,000 More!, McGraw-Hill, 2004, 176 pages.
Leonhardt, David, The Internet Knows What You'll Do Next, Jul. 5, 2006, http://www.nytimes.com/2006/07/05/business/05leonhardt.html?ex=1309752000&en=8be0be92819a6f8f&ei=5088&partner=rssnyt&emc=rss.
Manski, C et al., "Monotone Instrumental Variables: With an Application to the Returns to Schooling," Econometrica 68 (Jul. 2000) pp. 997-1010.
McCluskey, William J. et al., "An Evaluation of MRA, Comparable Sales Analysis, and ANNs for the Mass Appraisal of Residential Properties in Northern Ireland," Assessment Journal, Jan./Feb. 1997, 8 pages.
McGarity, M., "The Values Debate," Mortgage Banking, vol. 65, Issue 6, Mar. 1, 2005, 14 pages.
McWilliams, Charlyne H., "The Tale of AVMs," Mortgage Banking, vol. 64, Issue 5, Feb. 1, 2004, 7 pages.
Melville, J., "How much should I charge to rent my house?", published Dec. 5, 2010, retrieved from http://homeguides.sfgate.com/much-should-charge-rent-house-8314.html on Aug. 11, 2016, 2 pages.
Meyer, Robert T., "The Learning of Multiattribute Judgment Policies," The Journal of Consumer Research, vol. 14, No. 2, Sep. 1987, 20 pages . . . .
Microstrategy Inc.'s Opposition to Plaintiff Vasudevan Software, Inc.'s Motion for Sanctions, Case No. 11-CV-06637-RS-PSG, Jan. 4, 2013, 23 pages.
Mikhed, V., et al., "Testing for Bubbles in Housing Markets: A Panel Data Approach," The Journal of Real Estate Finance and Economics, vol. 38, 2007, pp. 366-386.
Miller et al., A Note on Leading Indicators of Housing Market Price Trends, vol. 1, No. 1, 1986.
Miller et al., Multiple Regression Condominium Valuation with a Touch of Behavioral Theory, The Appraisal Journal 1987.
Miller et al., Pricing Strategies and Residential Property Selling Prices, The Journal of Real Estate Research, vol. 2, No. 1, Nov. 1, 1987.
Miller et al., The Impact of Interest Rates and Employment on Nominal Housing Prices, International Real Estate Review, vol. 8 No. 1, pp. 26-42, 2005.
Mobasher B. "Classification Via Decision Trees in WEKA," DePaul University, Computer Science, Telecommunications, and Information Systems, ECT 584-Web Data Mining, 2005, http://maya.cs.depaul.edu/~classes/Ect584/WEKA/classify.html, [internet accessed on Dec. 6, 2007], 5 pages.
Morton, T. Gregory, Regression Analysis Appraisal Models: Selected Topics and Issues, Center for Real Estate and Urban Economic Studies, University of Connecticut, Real Estate Report: No. 19, Oct. 1976, 85 pages.
Motion for Pro Hac Vice Admission and Exhibit A for U.S. Pat. No. 7,970,674, Case No. IPR2013-00034, Filing Date Dec. 17, 2012, 13 pages.
MRMLS Realist Tax System Foreclosure User Guide, crmls.org/help/realist_manuals/realist_foreclosure.pdf. Oct. 30, 2007.
MSN House & Home—More Useful Everyday screen capture, [online], Retrieved from the Internet via the Wayback Machine dated Mar. 23, 2003 on Jun. 19, 2013, URL: http://web.archive.org/web/20030323183505/http://houseandhome.msn.com/, 2 pages.
Mullaney, Timothy J., "A New Home Site on the Block," Bloomberg Businessweek [online], Feb. 7, 2006, Retrieved from the Internet: URL: http://www.businessweek.com/stories/2006-02-07/a-new-home-site-on-the-block, 3 pages.
Munarriz, Rick A., "Pop Goes the Bubble," The Motley Fool, Fool.com [online] Feb. 14, 2006, Retrieved from the Internet; URL: http://www.fool.com/investing/small-cap/2006/02/14/pop-goes-the-bubble.aspx, 4 pages.
Nazerzadeh, H., "Internet Advertising: Optimization and Economic Aspects," Stanford University, 2009, 6 pages.
Non-Final Office Action for U.S. Appl. No. 12/924,037, dated May 27, 2014, 14 pages.

(56) References Cited

OTHER PUBLICATIONS

Non-Final Office Action for U.S. Appl. No. 13/044,480, dated Aug. 17, 2016, 40 pages.
Non-Final Office Action for U.S. Appl. No. 13/044,490, dated Jul. 22, 2016, 11 pages.
Non-Final Office Action for U.S. Appl. No. 11/347,000, dated Oct. 27, 2010, 23 pages.
Non-Final Office Action for U.S. Appl. No. 11/347,000, dated Nov. 23, 2012, 6 pages.
Non-Final Office Action for U.S. Appl. No. 11/347,000, dated Apr. 9, 2010, 18 pages.
Non-Final Office Action for U.S. Appl. No. 11/347,000, dated May 27, 2011, 13 pages.
Non-Final Office Action for U.S. Appl. No. 11/347,024, dated Dec. 10, 2009, 45 pages.
Non-Final Office Action for U.S. Appl. No. 11/347,024, dated May 13, 2010, 33 pages.
Non-Final Office Action for U.S. Appl. No. 11/524,047, dated May 7, 2012, 7 pages.
Non-Final Office Action for U.S. Appl. No. 11/524,047, dated Oct. 28, 2009, 8 pages.
Non-Final Office Action for U.S. Appl. No. 11/524,047, dated Nov. 4, 2013, 8 pages.
Non-Final Office Action for U.S. Appl. No. 11/524,047, dated Dec. 1, 2014, 26 pages.
Non-Final Office Action for U.S. Appl. No. 11/524,047, dated Jul. 8, 2011, 7 pages.
Non-Final Office Action for U.S. Appl. No. 11/524,048, dated Apr. 29, 2009, 10 pages.
Non-Final Office Action for U.S. Appl. No. 11/927,623, dated Jan. 11, 2016, 13 pages.
Non-Final Office Action for U.S. Appl. No. 11/927,623, dated Mar. 26, 2018, 15 pages.
Non-Final Office Action for U.S. Appl. No. 11/927,623, dated Oct. 6, 2017, 15 pages.
Non-Final Office Action for U.S. Appl. No. 11/927,623, dated Nov. 5, 2019, 18 pages.
Non-Final Office Action for U.S. Appl. No. 11/927,623, dated Dec. 28, 2010, 10 pages.
Non-Final Office Action for U.S. Appl. No. 11/971,758, dated Feb. 2, 2011, 22 pages.
Non-Final Office Action for U.S. Appl. No. 12/924,037, dated Jan. 10, 2018, 17 pages.
Non-Final Office Action for U.S. Appl. No. 12/924,037, dated Jan. 10, 2013, 9 pages.
Non-Final Office Action for U.S. Appl. No. 12/924,037, dated Nov. 7, 2018, 10 pages.
Non-Final Office Action for U.S. Appl. No. 12/924,037, dated Nov. 10, 2016, 19 pages.
Non-Final Office Action for U.S. Appl. No. 12/924,037, dated Nov. 17, 2014, 13 pages.
Non-Final Office Action for U.S. Appl. No. 13/044,480, dated Mar. 12, 2015, 32 pages.
Non-Final Office Action for U.S. Appl. No. 13/044,480, dated May 2, 2018, 51 pages.
Non-Final Office Action for U.S. Appl. No. 13/044,480, dated Jul. 17, 2014, 31 pages.
Non-Final Office Action for U.S. Appl. No. 13/044,480, dated Oct. 24, 2013, 29 pages.
Non-Final Office Action for U.S. Appl. No. 13/044,490, dated Dec. 17, 2014, 30 pages.
Non-Final Office Action for U.S. Appl. No. 13/044,490, dated Jan. 14, 2016, 18 pages.
Non-Final Office Action for U.S. Appl. No. 13/044,490, dated Jan. 24, 2018, 8 pages.
Non-Final Office Action for U.S. Appl. No. 13/044,490, dated Oct. 11, 2012, 30 pages.
Non-Final Office Action for U.S. Appl. No. 13/417,804, dated Jan. 28, 2015, 12 pages.
Non-Final Office Action for U.S. Appl. No. 13/417,804, dated Feb. 26, 2014, 13 pages.
Non-Final Office Action for U.S. Appl. No. 13/828,680, dated Dec. 15, 2015, 42 pages.
Non-Final Office Action for U.S. Appl. No. 13/828,680, dated Jul. 1, 2019, 63 pages.
Non-Final Office Action for U.S. Appl. No. 13/828,680, dated Jul. 27, 2020, 66 pages.
Non-Final Office Action for U.S. Appl. No. 13/828,680, dated Nov. 16, 2017, 47 pages.
Non-Final Office Action for U.S. Appl. No. 13/830,497, dated Apr. 12, 2018, 48 pages.
Non-Final Office Action for U.S. Appl. No. 13/830,497, dated Sep. 14, 2016, 52 pages.
Non-Final Office Action for U.S. Appl. No. 13/843,577, dated Sep. 24, 2015, 50 pages.
Non-Final Office Action for U.S. Appl. No. 13/843,577, dated Dec. 19, 2016, 80 pages.
Non-Final Office Action for U.S. Appl. No. 13/843,577, dated Aug. 30, 2018, 63 pages.
Non-Final Office Action for U.S. Appl. No. 13/943,604, dated Nov. 19, 2014, 24 pages.
Non-Final Office Action for U.S. Appl. No. 14/041,450, dated Jan. 8, 2019, 23 pages.
Non-Final Office Action for U.S. Appl. No. 14/041,450, dated Aug. 18, 2016, 48 pages.
Non-Final Office Action for U.S. Appl. No. 14/041,450, dated Nov. 16, 2017, 11 pages.
Non-Final Office Action for U.S. Appl. No. 14/078,076, dated Aug. 14, 2015, 15 pages.
Non-Final Office Action for U.S. Appl. No. 14/078,076, dated Oct. 19, 2016, 29 pages.
Non-Final Office Action for U.S. Appl. No. 14/167,962, dated Mar. 3, 2015, 26 pages.
Non-Final Office Action for U.S. Appl. No. 14/167,962, dated Apr. 6, 2017, 22 pages.
Non-Final Office Action for U.S. Appl. No. 14/167,962, dated Oct. 31, 2014, 23 pages.
Non-Final Office Action for U.S. Appl. No. 14/191,388, dated Aug. 7, 2014, 5 pages.
Non-Final Office Action for U.S. Appl. No. 14/318,536, dated Aug. 8, 2014, 38 pages.
Non-Final Office Action for U.S. Appl. No. 14/325,094, dated Oct. 31, 2017, 69 pages.
Non-Final Office Action for U.S. Appl. No. 14/325,094, dated Nov. 4, 2019, 58 pages.
Non-Final Office Action for U.S. Appl. No. 14/325,094, dated Dec. 18, 2018, 95 pages.
Non-Final Office Action for U.S. Appl. No. 14/325,094, dated Aug. 10, 2020, 53 pages.
Non-Final Office Action for U.S. Appl. No. 14/524,148, dated Nov. 1, 2019, 44 pages.
Non-Final Office Action for U.S. Appl. No. 14/524,148, dated Dec. 15, 2017, 27 pages.
Non-Final Office Action for U.S. Appl. No. 14/524,148, dated Aug. 3, 2020, 65 pages.
Non-Final Office Action for U.S. Appl. No. 14/640,860, dated Mar. 7, 2018, 141 pages.
Non-Final Office Action for U.S. Appl. No. 14/640,860, dated Sep. 6, 2019, 83 pages.
Non-Final Office Action for U.S. Appl. No. 14/704,567, dated Apr. 1, 2019, 29 pages.
Non-Final Office Action for U.S. Appl. No. 14/704,567, dated Dec. 7, 2017, 19 pages.
Non-Final Office Action for U.S. Appl. No. 14/709,719, dated Jan. 31, 2018, 11 pages.
Non-Final Office Action for U.S. Appl. No. 14/709,719, dated Jun. 3, 2019, 29 pages.
Non-Final Office Action for U.S. Appl. No. 14/709,719, dated Sep. 4, 2020, 38 pages.
Non-Final Office Action for U.S. Appl. No. 14/721,437, dated Aug. 22, 2019, 84 pages.

(56) References Cited

OTHER PUBLICATIONS

Non-Final Office Action for U.S. Appl. No. 14/721,437, dated Dec. 18, 2017, 53 pages.
Non-Final Office Action for U.S. Appl. No. 14/846,632, dated Jan. 16, 2018, 9 pages.
Non-Final Office Action for U.S. Appl. No. 14/846,632, dated Nov. 29, 2019, 24 pages.
Non-Final Office Action for U.S. Appl. No. 14/846,632, dated Dec. 26, 2018, 13 pages.
Non-Final Office Action for U.S. Appl. No. 15/789,617, dated Mar. 26, 2020, 37 pages.
Non-Final Office Action for U.S. Appl. No. 16/125,318, dated Mar. 13, 2020, 20 pages.
Non-Final Office Action for U.S. Appl. No. 15/439,388, dated Oct. 18, 2019, 76 pages.
Non-Final Office Action for U.S. Appl. No. 15/698,276, dated Oct. 16, 2019, 34 pages.
Non-Final Office Action for U.S. Appl. No. 16/235,009, dated Jan. 24, 2020, 18 pages.
Notice of Allowance for U.S. Appl. No. 11/347,024, dated Apr. 18, 2011, 7 pages.
Notice of Allowance for U.S. Appl. No. 11/347,000, dated Oct. 24, 2013, 12 pages.
Notice of Allowance for U.S. Appl. No. 11/524,048, dated Feb. 25, 2013, 14 pages.
Notice of Allowance for U.S. Appl. No. 11/524,048, dated Jul. 3, 2013, 11 pages.
Notice of Allowance for U.S. Appl. No. 11/524,048, dated Jul. 18, 2013, 10 pages.
Notice of Allowance for U.S. Appl. No. 11/971,758, dated Nov. 10, 2011, 12 pages.
Notice of Allowance for U.S. Appl. No. 12/924,037, dated Apr. 24, 2019, 11 pages.
Notice of Allowance for U.S. Appl. No. 13/044,480, dated Jun. 26, 2019, 17 pages.
Notice of Allowance for U.S. Appl. No. 13/044,490, dated May 22, 2018, 8 pages.
Notice of Allowance for U.S. Appl. No. 13/044,490, dated Dec. 5, 2018, 6 pages.
Notice of Allowance for U.S. Appl. No. 14/846,632, dated Sep. 16, 2020, 11 pages.
Notice of Allowance for U.S. Appl. No. 13/417,804, dated Aug. 18, 2016, 15 pages.
Notice of Allowance for U.S. Appl. No. 14/167,962, dated Apr. 9, 2018, 11 pages.
Notice of Allowance for U.S. Appl. No. 14/167,962, dated May 14, 2018, 8 pages.
Notice of Allowance for U.S. Appl. No. 14/191,388, dated Jun. 25, 2014, 9 pages.
Notice of Allowance for U.S. Appl. No. 14/704,567, dated Jun. 25, 2020, 17 pages.
Notice of Allowance for U.S. Appl. No. 14/704,567, dated Oct. 15, 2019, 17 pages.
Notice of Allowance for U.S. Appl. No. 15/439,388, dated Jan. 23, 2020, 12 pages.
Notice of Allowance for U.S. Appl. No. 15/439,388, dated May 27, 2020, 12 pages.
Notice of Allowance for U.S. Appl. No. 14/078,076, dated Apr. 10, 2020, 9 pages.
Notice of Allowance for U.S. Appl. No. 14/078,076, dated May 20, 2020, 17 pages.
Notice of Appeal for U.S. Pat. No. 7,970,674, Case IPR2013-00034, May 1, 2014, 5 pages.
O'Brien, Jeffrey M., "What's Your House Really Worth?," Fortune [online], Feb. 15, 2007, Retrieved from the Internet: URL: http://money.cnn.com/magazines/fortune/fortune_archive/2007/02/19/8400262/index.htm, 6 pages.
Oladunni, T et al., "Predictive Real Estate Multiple Listing System Using MVC Architecture and Linear Regression," ISCA 24th International Conference on Software Engineering and Data Engineering, 2015.
Oladunni, T. et al., "Hedonic Housing Theory—A Machine Learning Investigation," 2016.
Oldham, Jennifer, "Pricing's Tangled Web, Consumers Using the Internet to Calculate Home Values Find that the Results—and Data They're Based on—Vary," Los Angeles Times, Jul. 30, 2000, 5 pages.
One-month Office Action for U.S. Appl. No. 11/347,000, dated Jul. 26, 2013, 6 pages.
Oral Hearing Petitioner Demonstratives, U.S. Pat. No. 7,970,674, Case IPR2013-00034, Emailing date Nov. 14, 2013, 85 pages.
Oral Hearing Transcript for U.S. Pat. No. 7,970,674, Case IPR2013-00034, Held Nov. 21, 2013, Entered Feb. 20, 2014, 96 pages.
Order Authorizing Motion for Pro Hac Vice Admission for U.S. Pat. No. 7,970,674, Case No. IPR2013-00034, Filing Date Jan. 3, 2013, 4 pages.
Pagourtzi, E. et al., "Real Estate Appraisal: A Review of Valuation Methods," Journal of Property Investment & Finance, vol. 21, No. 4, 2003, pp. 383-401.
Palmquist, Raymond B., "Alternative Techniques for Developing Real Estate Price Indexes," The Review of Economics and Statistics, vol. 62, No. 3 (Aug. 1980), pp. 442-448.
PASS screen capture, dated at least by Oct. 20, 2004, 1 page.
Patent Owner's Demonstrative Exhibit for Oral Hearing, U.S. Pat. No. 7,970,674, Case IPR2013-00034, Exhibit 2023, Emailing date Nov. 21, 2013, 56 pages.
Patent Owner's Observations on Cross Examination of Dr. Richard A. Borst, Ph.D., U.S. Pat. No. 7,970,674, Case IPR2013-00034, Oct. 10, 2013, 9 pages.
Patent Owner's Response to Revised Petition for Inter Partes Review for U.S. Pat. No. 7,970,674, Case No. IPR2013-00034, Jun. 14, 2013, 41 pages.
Patent Owner's Response to the Petition for Covered Business Method Patent Review for U.S. Pat. No. 7,970,674, Case No. CBM2013-00056, Jun. 20, 2014, 72 pages.
Petition for Covered Business Method Patent Review for U.S. Pat. No. 7,970,674, CBM2013-00056, Sep. 11, 2013, 87 pages.
Petition for Covered Business Method Patent Review for U.S. Pat. No. 7,970,674, CBM2014-00115, Apr. 10, 2014, 69 pages.
Petition for Inter Partes Review for U.S. Pat. No. 7,970,674, Case No. IPR2013-00034, mailing date Oct. 26, 2012, 65 pages.
Petitioner Response to Patent Owner's Observations on Cross Examination of Dr. Richard A. Borst, Ph.D., Patent 7,970,674, Case IPR2013-00034, Oct. 24, 2013, 7 pages.
Petitioner's Reply to Patent Owner Response to Petition, Patent No. 7,970,674, Case No. IPR2013-00034, Aug. 26, 2013, 20 pages.
Plaintiff Vasudevan Software, Inc.'s Notice of Motion and Motion for Sanctions Against Microstrategy, Case No. 3:11-06637-RS-PSG, Dec. 12, 2012, 23 pages.
Plaintiff Vasudevan Software, Inc.'s Reply in Support of Motion for Sanctions Against Microstrategy, Case No. 3:11-06637-RS-PSG, Jan. 24, 2013, 25 pages.
Potharst, R. et al., "Classification Trees for Problems with Monotonicity Constraints," ACM SIGKDD Explorations Newsletter 4.1, 2002, pp. 1-10.
Potharst, R. et al., "Classification Trees for Problems with Monotonicity Constraints," ERIM Report Series Research in Management, Erasmus Research Institute of Management, Apr. 2002, 39 pages.
PowerBase 6.0 screen capture, dated at least by Oct. 20, 2004, 1 page.
Prasad, Nalini et al., "Measuring Housing Price Growth-Using Stratification to Improve Median-based Measures", Reserve Bank of Australia, 2006, p. 1.
Preliminary Patent Owner Response and Exhibits for U.S. Pat. No. 7,970,674, Case No. IPR2013-00034, Feb. 15, 2013, 228 pages.
Preliminary Patent Owner Response for U.S. Pat. No. 7,970,674, Case No. CBM2013-00056, Dec. 18, 2013, 85 pages.
Preliminary Patent Owner Response for U.S. Pat. No. 7,970,674, Case No. IPR2013-00034, Feb. 15, 2013, 39 pages.

(56) References Cited

OTHER PUBLICATIONS

Quercia, R.G. et al., "Spatio-Temporal Measurement of House Price Appreciation in Underserved Areas," J. of Housing Research, vol. 11, 2000, available at https://pdfs.semanticscholar.org/3a44/ddfbc508f61f8952d7e440c37cfdfaf441 ba.pdf (accessed Feb. 26, 2018). (Year: 2000).

Quinlan, Ross J., "C4.5: Programs for Machine Learning," Machine Learning, 1993, Morgan Kaufmann Publishers, San Francisco, CA, USA., 302 pages.

Quirk, B., "Zilpy.com launches a rental data website built in partnership with Zillow!!!", published Jan. 29, 2008, retrieved from http://www.propertymanagementmavens.com/archives/2008/1 on Aug. 11, 2016, 3 pages.

Readyratios.com, "Cost Approach to Value," https://www.readyratios.com/reference/appraisal/cost_approach_to_value.html, archived on Jul. 16, 2013, https://web.archive.org/web/20130716153950/https:www.readyratios.com/reference/appraisal/cost_approach_to_value.html, viewed Oct. 30, 2018, p. 1.

Real Info Inc., RELAR Sample Report, <http://www.real-info.com/products_RELAR.asp> Aug. 18, 2010, Archived by Internet Wayback Machine <http://web.archive.org/web/20100818012252/http://www.real-info.com/products_RELAR.asp> viewed Aug. 24, 2015, pp. 1-4.

RealestateABC.com, see paragraph headed "How do I make the estimate more accurate?" www.realestateabc.com/home-values/ <http://www.realestateabc.com/home-values/>, Internet Archive Dated: Apr. 5, 2006, [accessed Mar. 20, 2007], 4 pages.

Real-info.com, "What is an AVM," www.real-info.com/products_avm.asp? Internet Archive Date: Oct. 30, 2005, [accessed Mar. 21, 2007], 5 pages.

RealQuest.com screen capture, dated at least by Dec. 12, 2002, 1 page.

RealQuest.com screen capture, dated at least by Oct. 20, 2004, 1 page.

RealQuest.com ValuePoint R4 Report screen capture, dated at least by Sep. 30, 2002, 1 page.

RealQuest.com Vector screen capture, dated at least by Oct. 20, 2004, 1 page.

Redfin, https://web.archive.org/web/20060907212454/http ://www.redfin.com/stingray/do/terms-ofuse?rt=fn-tl, Wayback Machine Sep. 7, 2006.

Reis SE 2.0 User Guide Book, Reis, 2004, 40 pages.

Reis SE 2.0 User Guide Book, Reis, 2005, 37 pages.

Reis Valuation and Credit Risk Analysis Module Overview, [online], Sep. 18, 2003, Retrieved from the Internet via the Wayback Machine dated Sep. 19, 2003 on Jun. 17, 2013, URL: http://www.reiscom/valuation/valuationOverview.cfm, 2 pages.

Remodeling Magazine, Remodeling Cost vs Value Report 2006, Hanley Wood LLC, pp. 1-6.

Replacement Demonstrative Exhibit for Oral Hearing, U.S. Pat. No. 7,970,674, Case IPR2013-00034, File Date Nov. 21, 2013, 83 pages.

Replacement Patent Owner's Demonstrative Exhibit for Oral Hearing, U.S. Pat. No. 7,970,674, Case IPR2013-00034, File Date Nov. 21, 2013, 36 pages.

Reply Brief for U.S. Appl. No. 11/524,048, filed Dec. 22, 2010, 6 pages.

Request for Rehearing for U.S. Pat. No. 7,970,674, Case No. IPR2013-00034, Apr. 16, 2013, 8 pages.

Requirement Under Rule 105 for U.S. Appl. No. 11/927,623, dated Jul. 2, 2014, 4 pages.

Response to Decision on Appeal for U.S. Appl. No. 11/524,048, filed Dec. 19, 2012, 7 pages.

Response to Final Office Action for U.S. Appl. No. 11/347,024, filed Mar. 4, 2011, 17 pages.

Revised Petition for Inter Partes Review for U.S. Pat. No. 7,970,674, Case No. IPR2013-00034, mailing date Nov. 13, 2012, 55 pages.

Rossini, Peter, "Using Expert Systems and Artificial Intelligence for Real Estate Forecasting," Sixth Annual Pacific-Rim Real Estate Society Conference, Sydney, Australia, Jan. 24-27, 2000, 10 pages.

Roth, JD, "Is it Better to Rent or to Buy?" Time Business, Dec. 3, 2012, 2 pages.

Rye, Owen E., "A Multiple Criteria Analysis Model For Real Estate Evaluation," Journal of Global Optimization 12.2, Mar. 1998, pp. 197-214.

Rye, Owen E., "Automated Property Assessment," Transactions of the American Association of Cost Engineers, Nov. 2004, pp. 28-32.

Sample Appraisal Report of a Single-Family Residence, U.S. Appraisal, Sep. 15, 1982, 16 pages.

Sample HomeSmart Value Report, [online], Retrieved from the Internet via the Wayback Machine dated Dec. 10, 2005 on Jun. 19, 2013, URL: http://homesmartreports.com/samples/samplevaluation.htm, 4 pages.

Sample Residential Appraisal Report, U.S.Appraisal, Jul. 16, 1982, 2 pages.

Second Office Action in Chinese Patent Application No. 200710306194.8, dated Apr. 1, 2010, 9 pages, english translation.

Simons, R. A., "Chapter 6: Valuation of Impaired Property," When Bad Things Happen To Good Property, Throupe, R. et al., Environmental Law Institute, May 2006, 30 pages.

Software Referral Agreement with Sole Source Provision between Sperry Corporation and U.S. Appraisal, May 1985, 47 pages.

Standard & Poors, "Guidelines for the use of Automated Valuation Models for U.K. RMBS Transactions," http://www.rics.org/NR/rdonlyres/8Fcdd20c-7FAC-4549-86FB-3930CD0CBC05/0/StandardandPoorsReportonAVMs.pdf, Published Feb. 20, 2004, 4 pages.

Statsoft, Inc., "Classification Trees," http://www.statsoft.com/textbook/stclatre.html, ã1984-2003 [accessed Dec. 13, 2005], pp. 1-20.

Svetnik et al., "Random Forest: A Classification and Regression Tool for Compound Classification and QSAR Modeling", J Chem Info. Computer Science, vol. 43, 2003, pp. 1947-1958.

System Operations Manual for "The Research Assistant", Evaluation Services, Inc., Feb. 12, 1997, 92 pages.

System Operations Manual, "The Research Assistant", Database Valuation Version, Evaluation Services, Inc., Feb. 12, 1997, 35 pages.

Tay et al., "Artificial Intelligence and the Mass Appraisal of Residential Apartments," Journal of Property Valuation and Investment, Feb. 1, 1992, 17 pages.

The Assessor, A Computerized Assessment System, NCR Corporation, 1986, 6 pages.

The MicroAppraisal, Certificate of Copyright Registration, Feb. 2, 1984, 2 pages.

Transcript of Deposition of R. A. Borst, Ph. D., Case IPR2013-00034 (JL), Transcribed Sep. 19, 2013, 177 pages.

Transcript of Proceedings in Case No. C 11-06637 RS, Jan. 24, 2013, 24 pages.

Turner, J., "Ad Slotting and Pricing: New Media Planning Models For New Media," Carnegie Mellon University, Apr. 23, 2010, 132 pages.

U.S. Appraisal Business Plan, dated at least since Aug. 1, 1985, 30 pages.

U.S. Appraisal Offering Memorandum, Sep. 12, 1984, 66 pages.

US. Appraisal Profit and Loss Proforma, dated at least since Aug. 1, 1985, 38 pages.

Valuation Reports, Schedule A, U.S. Appraisal, dated at least by Nov. 1, 1986, 6 pages.

Valuations, Claims Cross Engines, Inman News Features, Dec. 10, 2002, 1 page.

ValuePoint4 Report; File No. 04040103629, Apr. 12, 2004, 3 pages.

Vapnik et al., "Support-Vector Networks," Machine Learning, vol. 20, 1995, 25 pages.

VeroValue screen capture, dated at least by Sep. 30, 2004, 1 page.

Visual PAMSPro 2000, [online], Retrieved from the Internet via the Wayback Machine dated Mar. 4, 2001 on Jun. 19, 2013, URL: http://www.visualpamspro.com/prod01.htm, 2 pages.

Visual PAMSPro Custom Add Ins, [online], Retrieved from the Internet via the Wayback Machine dated Mar. 5, 2001 on Jun. 19, 2013, URL: http://www.visualpamspro.com/serv04.htm, 2 pages.

Visual PAMSPro Downloads, [online], Retrieved from the Internet via the Wayback Machine dated Mar. 2, 2001 on Jun. 19, 2013, URL: http://www.visualpamspro.com/download.htm, 1 page.

(56) References Cited

OTHER PUBLICATIONS

Visual PAMSPro Home, [online], Retrieved from the Internet via the Wayback Machine dated Mar. 2, 2001 on Jun. 19, 2013, URL: http://www.visualpamspro.com/, 1 page.
Visual PAMSPro News, [online], Retrieved from the Internet via the Wayback Machine dated Mar. 2, 2001 on Jun. 19, 2013, URL: http://www.visualpamspro.com/news.htm, 2 pages.
Visual PAMSPro Products, [online], Retrieved from the Internet via the Wayback Machine dated Mar. 2, 2001 on Jun. 19, 2013, URL: http://www.visualpamspro.com/products.htm, 1 page.
Visual PAMSPro Real Estate Appraisal Software, Appraisal Software Real Estate, [online], Retrieved from the Internet via the Wayback Machine dated Sep. 2, 2001 on Jun. 19, 2013, URL: http://www.visualpamspro.com/prodvpp2.htm, 6 pages.
Visual PAMSPro Tips and Tricks, [online], Retrieved from the Internet via the Wayback Machine dated Mar. 2, 2001 on Jun. 19, 2013, URL: http://www.visualpamspro.com/Tips-Tricks.htm, 1 page.
Wen, H.Z . . . Et al., "An improved method of real estate evaluation based on Hedonic price model," IEEE International Engineering Management Conference, 2004.
Wikipedia, Expectation-maximization Algorithm, [online] Retrieved from the Internet via the Wayback Machine dated Dec. 21, 2013 on Feb. 28, 2014, URL: http://en.wikipedia.org/wiki/Expectation%E2%80%93maximization_algorithm, 13 pages.
Wikipedia, Survival Analysis, <http://en.wikipedia.org/wiki/Survival_analysis> Oct. 16, 2011, Archived by Internet Wayback Machine <http://web.archive.org/web/20111016061152/http://!en.wikipedia.org/wiki/Survival_analysis>, viewed Aug. 28, 2015, pp. 1-5.
Zillow.com, Quarterly Report 2Q 2006, A Review of the San Francisco Real Estate Market.
Zurowski, B, "Essays in Social and Behavioral Economics," Retrieved from the University of Minnesota Digital Conservancy, http://hdl.handle.net/11299/175495, 2015.
U.S. Appl. No. 11/927,623 for Humphries et al. filed Oct. 29, 2007.
U.S. Appl. No. 13/828,680 for Humphries et al. filed Mar. 14, 2013.
U.S. Appl. No. 13/830,497 for Humphries et al. filed Mar. 14, 2013.
U.S. Appl. No. 13/843,577 for Humphries et al. filed Mar. 15, 2013.
U.S. Appl. No. 14/041,450 for Humphries et al. filed Sep. 30, 2013.
U.S. Appl. No. 14/325,094 for Bruce et al. filed Jul. 7, 2014.
U.S. Appl. No. 14/524,148 for Humphries et al. filed Oct. 27, 2014.
U.S. Appl. No. 14/640,860 for Rao et al. filed Mar. 6, 2015.
U.S. Appl. No. 14/709,719 for Humphries et al. filed May 12, 2015.
U.S. Appl. No. 14/721,437 for Humphries et al. filed May 26, 2015.
U.S. Appl. No. 15/456,235 for VanderMey filed Mar. 10, 2017.
U.S. Appl. No. 15/698,276 for Humphries et al. filed Sep. 7, 2017.
U.S. Appl. No. 15/715,098 for Moghimi filed Sep. 25, 2017.
U.S. Appl. No. 15/996,787 for VanderMey filed Jun. 4, 2018.
U.S. Appl. No. 16/129,282 for Humphries et al. filed Sep. 12, 2018.
U.S. Appl. No. 16/235,009 for Humphries et al. filed Dec. 28, 2018.
U.S. Appl. No. 16/665,426 for Humphries et al. filed Oct. 28, 2019.
U.S. Appl. No. 16/930,603 for Daimler et al. filed Jul. 16, 2020.
U.S. Appl. No. 17/002,969 for Bruce et al., filed Aug. 26, 2020.
U.S. Appl. No. 17/025,330 for Abdallah et al., filed Sep. 18, 2020.

\* cited by examiner

| Property ID | 1048 | 2038 |
|---|---|---|
| Address | 230 West End Avenue, #8AG | 201 West 70$^{th}$ Street, #12C |
| Status | Active | Active |
| Sale Price | $849,000 | $950,000 |
| Rental Price | $2,800 | $3,000 |
| Maintenance Fee | $2,176 | $1,650 |
| Size | 1,100 Sq. ft. | |
| No. Bedrooms | 2 | 2 |
| No. Bathrooms | 2 | 1.5 |
| Washer/Dryer | Y | N |
| Outdoor Space | N | N |
| Fireplace | N | Y |
| Gym | Y | N |
| Doorman | Y | Y |
| Parking | Y | N |
| Pets Allowed | N | N |
| Pied-A-Terre Allowed | N | Y |
| Sublet Allowed | N | N |
| ⋮ | | |

*FIG. 2*

| | | |
|---|---|---|
| Sales Price: | Min: $600,000 — 401 | Max: $1,750,000 — 402 |
| No. Bedrooms: | Min: 2 — 411 | Max: — 412 |
| No. Bathrooms: | Min: 1.5 — 421 | Max: — 422 |
| Size: | Min: — 431 | Max: — 432 |
| Washer/Dryer: | Yes: ◉ — 441 | No: ◉ — 442 |
| Outdoor Space: | Yes: ◉ — 451 | No: ◉ — 452 |
| Fireplace: | Yes: ◉ — 461 | No: ◉ — 462 |

FLEXIBLE REAL ESTATE SEARCH

CROSS-REFERENCE TO RELATED APPLICATION(S)

This application is a continuation of U.S. patent application Ser. No. 14/078,076 filed on Nov. 12, 2013, which is incorporated herein by reference in its entirety.

TECHNICAL FIELD

The described technology is directed to the field of automated real estate information tools.

BACKGROUND

In today's housing market, property seekers often use online tools to find the properties of interest. For example, a property seeker might use such a tool to search for properties within a certain zip code having a certain minimum number of bedrooms.

BRIEF DESCRIPTION OF THE DRAWINGS

FIG. 2 is a table diagram showing example data stored in a property database.

FIG. 4 is an image diagram showing an example user interface for specifying search criteria for searching a property database.

FIG. 6 is an image diagram showing an example user interface for selecting a group of one or more property attributes to enhance the display of a result of searching a property database.

DETAILED DESCRIPTION

The inventors have recognized that conventional approaches to presenting properties in the housing markets have significant disadvantages. These typically limit a property seeker in the amount and types of information received regarding the properties in the markets, and thus make it harder for the property seeker to make an intelligent decision on which property to buy or rent.

Accordingly, the inventors have conceived a software and/or hardware facility for allowing a user to control the amount and types of information to receive regarding the properties of interest. In some embodiments, the facility initially displays a result of searching a property database and subsequently allows a user to select additional information to display for each property in the search result. Specifically, the facility may initially display values of one or more property attributes in an initial display group for each property in the search result, allow a user to select one or more property attributes that are in a subsequent display group but not in the initial display group, and display values of the property attributes in both the initial and subsequent display groups for each property in the search result in response to the user selection.

In certain embodiments, the facility allows a user to select a search group of one or more property attributes to control the search and require that the one or more property attributes in the search group be excluded from the subsequent display group. The facility may also require that the search group be contained in the initial display group.

In some embodiments, the facility allows a user to sort the result of searching the property database on any of the attributes of which the values are displayed for each property in the search result.

By performing in some or all of the ways described above, the facility affords property seekers more flexibility in customizing the presentation of the properties of interest than conventional approaches.

Figure 1:
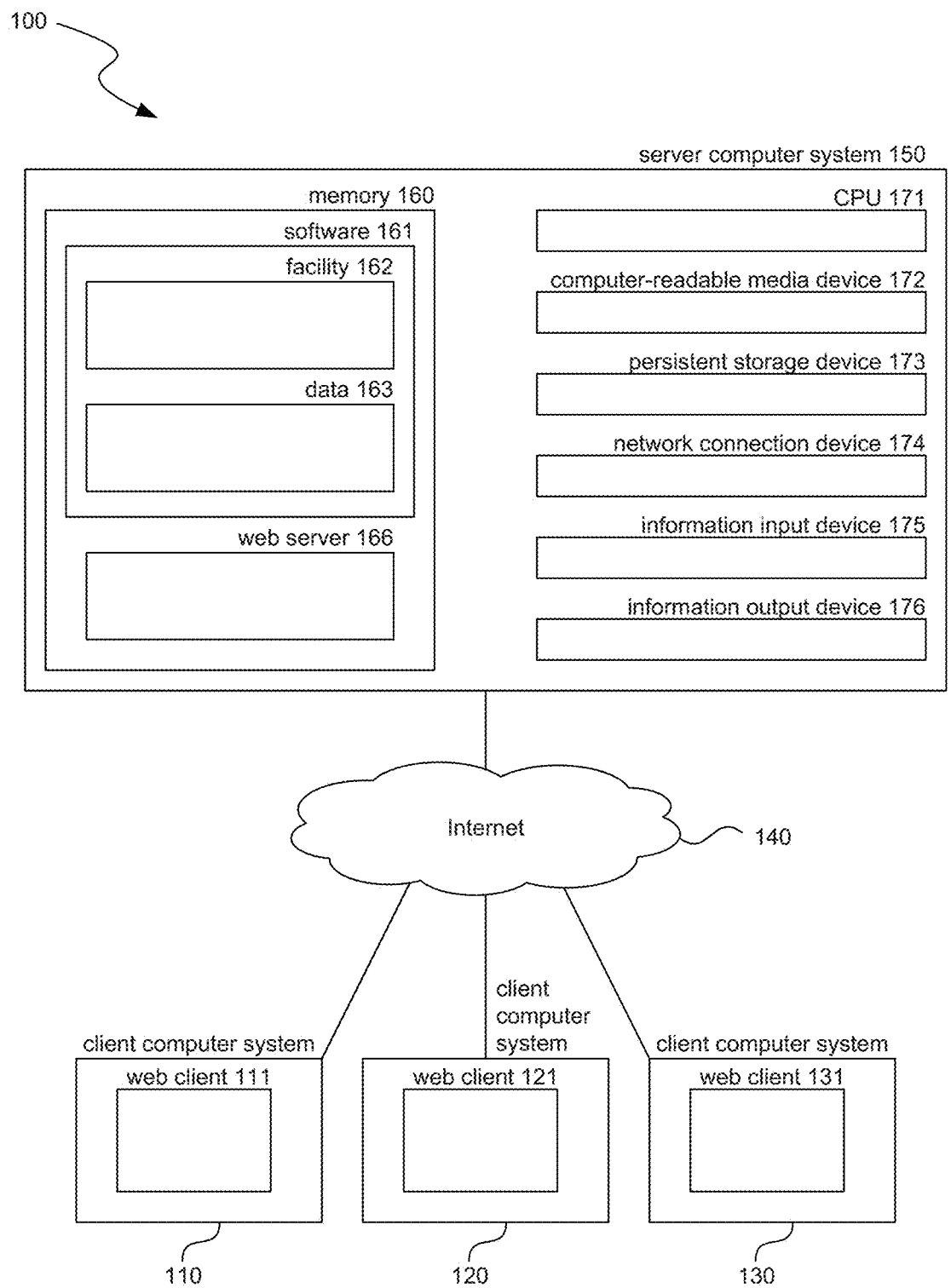
FIG. 1 is a high-level block diagram showing a typical environment in which a software, hardware, and/or firmware facility implementing the functionality described herein operates in some embodiments.

FIG. 1 is a high-level block diagram showing a typical environment in which a software, hardware, and/or firmware facility implementing the functionality described herein operates in some embodiments. The environment 100 includes a server computer system 150. The server computer system 150 includes a memory 160. The memory 160 includes software 161 incorporating both the facility 162 and data 163 typically used by facility. The memory further includes a web server computer program 166 for providing web pages and/or other information, such as information produced by the facility, to other computers. While items 162 and 163 are stored in memory while being used, those skilled in the art will appreciate that these items, or portions of them, maybe be transferred between memory and a persistent storage device 173 for purposes of memory management, data integrity, and/or other purposes. The server computer system 150 further includes one or more central processing units (CPU) 171 for executing programs, such as programs 161, 162, and 166, and a computer-readable medium drive 172 for reading information or installing programs such as the facility from tangible computer-readable storage media, such as a floppy disk, a CD-ROM, a DVD, a USB flash drive, and/or other tangible computer-readable storage media. The computer system 150 also includes one or more of the following: a network connection device 174 for connecting to a network (for example, the Internet 140) to exchange programs and/or data via its networking hardware, such as switches, routers, repeaters, electrical cables and optical fibers, light emitters and receivers, radio transmitters and receivers, and the like; an information input device 175; and an information output device 176.

The block diagram also illustrates several client computer systems, such as client computer systems 110, 120, and 130. Each of the client computer systems includes a web client computer program, such as web clients 111, 121 and 131, for receiving web pages and/or other information in response to requests to web server computer programs, such as web server computer program 166. The client computer systems are connected via the Internet 140 or a data transmission network of another type to the server computer system 150. Those skilled in the art will recognize that the client computer systems could be connected to the server computer system 150 by networks other than the Internet, however. In some embodiments, some or all of the client computer systems are used to capture input to the facility and display output from the facility. In some embodiments, these client computer systems can include other server computer systems, desktop computer systems, laptop computer systems, mobile phones, personal digital assistants, tablet computers, televisions, cameras, automobile computers, electronic media players, etc. In various embodiments, these client computer systems include various combinations of the components shown in server computer system 150.

While various embodiments are described in terms of the environment described above, those skilled in the art will appreciate that the facility may be implemented in a variety of other environments including a single, monolithic computer system, as well as various other combinations of computer systems or similar devices connected in various ways.

The facility maintains a property database storing a variety of information for each property. The information may be represented as a list of property attributes, which may be further classified. FIG. 2 is a table diagram showing example information stored in the property database. The information is represented as a list of property attributes 202. Included in the table 200 are some common property attributes, such as the sales price, the maintenance fee, the size, the number of bedrooms and the number of bathrooms. Also included in the table 200 are additional property attributes which correspond to apartment features, such as washer/dryer and outdoor space, and building features, such as gym and parking. For example, for the first listed property, the following information is shown: a property ID of 1048, an active status, a sale price of $849,000, a rental price of $2,800, a maintenance fee of $2,176, a size of 1,100 square feet, two bedrooms, two bathrooms, having the washer/dryer, having no outdoor space, having no fireplace, having a gym, having a doorman, having parking space, allowing no pets, allowing no pied-a-terre, and allowing not subletting.

While FIG. 2 and each table diagram discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

Figure 3:
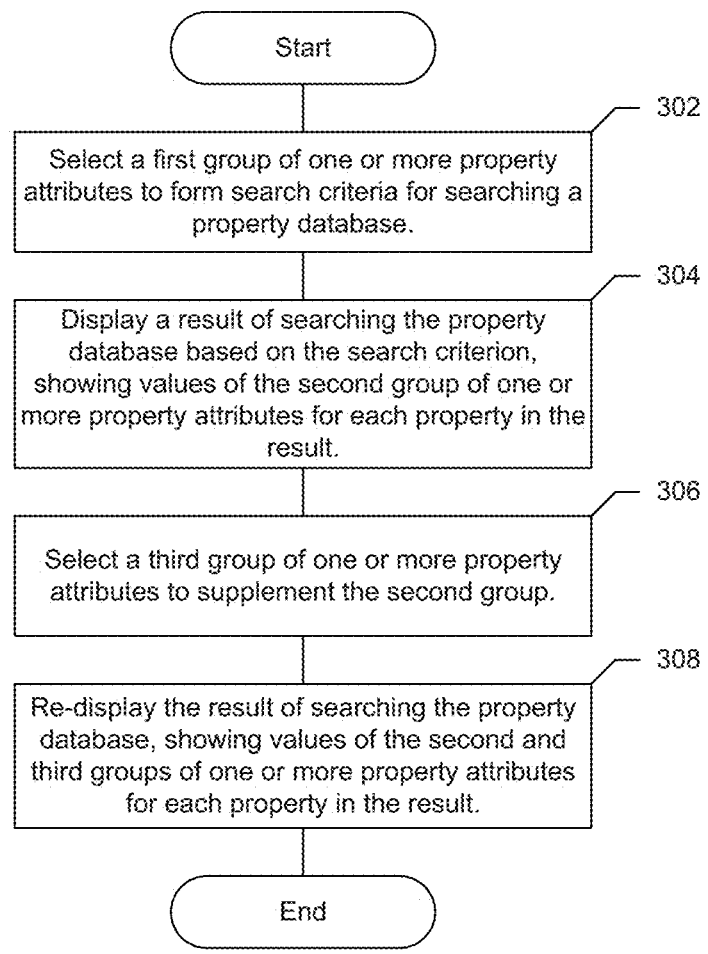
FIG. 3 is a flow diagraph showing steps typically performed by the facility in order to adjust the display of a result of searching a property database.

FIG. 3 is a flow diagraph showing steps typically performed by the facility in order to adjust a display of a result of searching the property database. In step 302, the facility selects a search group of one or more property attributes to form search criteria for searching the property database based on a search instruction received from a user. Specifically, the facility turns each property attribute in the search group into a search criterion by specifying one or more acceptable values, and combines the search criteria to form a filter. It will be appreciated that the facility does not place any specific limit on the number of property attributes to be included in the search group, and it allows multiple search criteria to be combined in various ways.

FIG. 4 is an image diagram showing an example user interface for specifying search criteria for searching the property database. With this user interface 400, a user may indicate the acceptable values for each property attribute. Specifically, the user may specify a range for the sale price in the fields 401 and 402, for the number of bedrooms in the fields 411 and 412, for the number of bathrooms in the fields 421 and 422, and for the size in the fields 431 and 432. The user may also designate yes or no for having a washer/dryer in either of the radio buttons 441 and 442, for having outdoor space in either of the radio buttons 451 and 452, and for having fireplaces in either of the radio buttons 461 and 462. In this example, the user specifies a sales price in the range between $600,000 and $1,750,000, a number of bedrooms of two or more, and a number of bathrooms of one-and-a-half or more. As a result, the facility takes these property attributes with specified values as search criteria. In some embodiments, the facility may enhance this user interface or offer another user interface for the user to specify how to combine the search criteria. For example, it may allow the user to search for properties with two bedrooms or two bathrooms, or for properties which have any number of bedrooms other than four.

In step 304, the facility displays a result of searching the property database using the search criteria. For each property in the property database that satisfies the search criteria, the facility shows the values of one or more property attributes in an initial display group for the property. It will be appreciated that the facility may determine whether a property satisfies the search criteria in various says, ranging from requiring an exact match of every search criterion to permitting one or more fuzzy matches and mismatches. In some embodiments, the facility represents the result as a table, where each row corresponds to a property that satisfies the search criteria and each column corresponds to a property attribute in the initial display group. In various embodiments, the facility shows information regarding only a predetermined number of properties that satisfy the search criteria, switch the rows and columns, or represent the result as a list. The facility may select the initial display group automatically or based on a user instruction. It will be appreciated that the facility does not place any specific limit on the number of property attributes to be included in the initial display group. In some embodiments, the initial display group contains the search group. In some embodiments, the facility sorts the result on one or more property attributes in the initial display group based on a user instruction and redisplays the result to the user.

Figure 5:
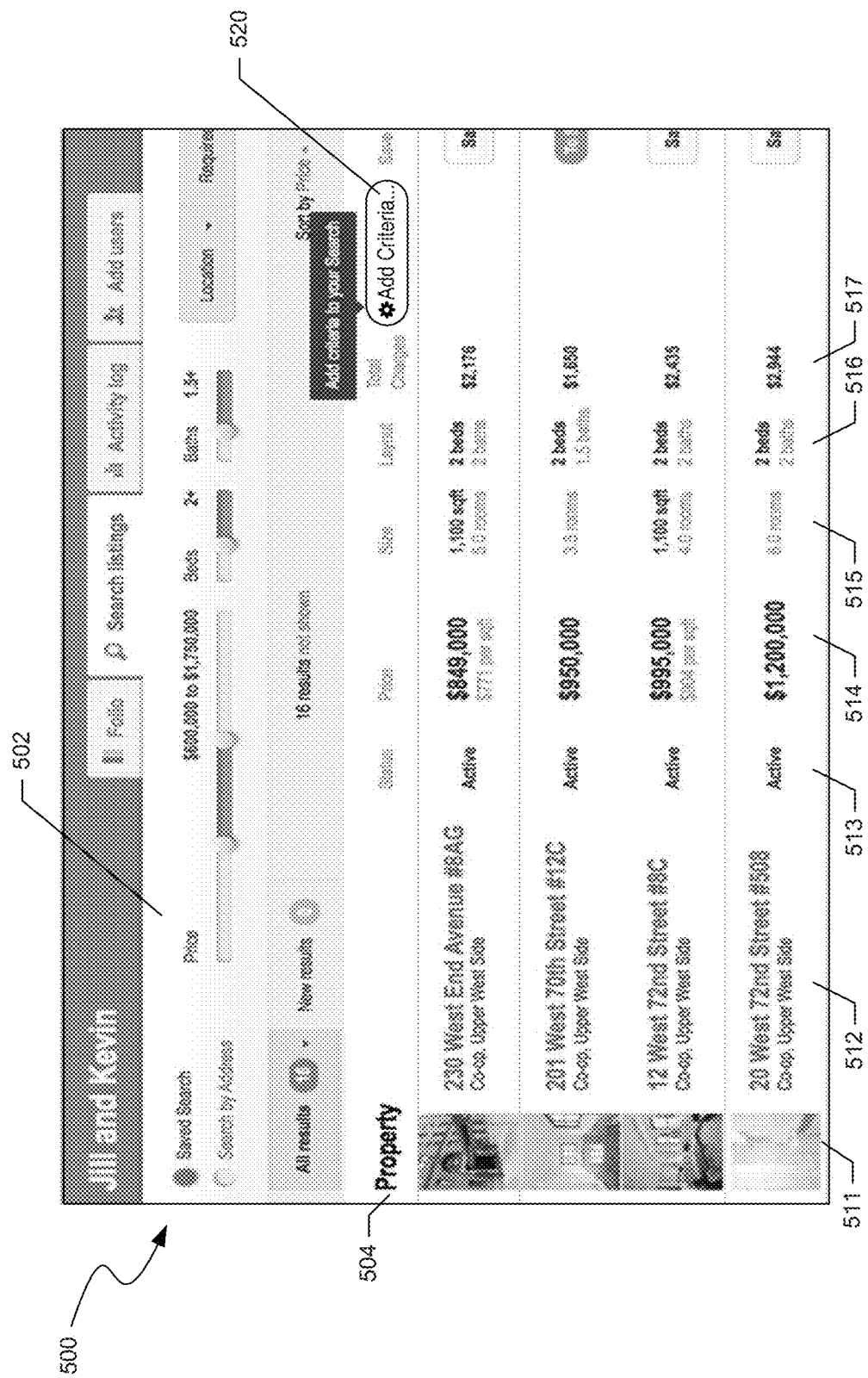
FIG. 5 is an image diagram showing an example user interface for displaying a result of searching a property database based on specified search criteria.

FIG. 5 is an image diagram showing an example user interface for displaying a result of searching the property database based on certain search criteria. With this user interface 500, the facility shows the search criteria in 502 and the corresponding search result in 504. In this example, the search criteria comprise a price in the range between $600,000 and $1,750,000, a number of bedrooms of two or more, and a number of bathrooms of one-and-a-half or more. Therefore, the price, the number of bedrooms and the number of bathrooms constitute the search group of property attributes. The facility includes the photo, the address, the status, the price, the size, the layout (numbers of bedrooms and bathrooms) and the total charges (maintenance fee and any other fees) of a property in the initial display group of property attributes. Therefore, for each property included in the search result, the facility shows the values of those property attributes in columns 511-517. For the first listed property, the following property attribute values are shown: a photo showing the building entrance, "230 West End Avenue #8AG", Active, $849,000, 1,100 square feet, 2 bedrooms and 2 bathrooms, and $2,176. As can be seen, all the property attributes in the search group belongs to the initial display group, but they do not have to be. Certain property attributes that are not in the search group are also included in the initial display group, but they also do not have to be. As will be discussed below, the facility also shows a button 520 to allow a user to enhance the display of the search result.

In step 306, the facility selects a subsequent display group of one or more property attributes based on a user instruction to enhance the display of the search result. Specifically, for each property that satisfies the search criteria, the facility shows the values of the property attributes in not only the initial display group but also the subsequent display group in response to the selection of the subsequent display group. It will be appreciated that the facility does not place any specific limit on the number of property attributes to be included in the subsequent display group. As the subsequent display group is used to augment the initial display group, any property attribute in the initial display group would not be in the subsequent display group. In some embodiments, any property attribute in the search group also would not be in the subsequent display group. It will be appreciated that the facility may also use the subsequent display group to simplify the display of the search result. Specifically, for each property that satisfies the search criteria, the facility would then show the values of the property attributes in the initial display group but not in the subsequent display group.

Figure 6:
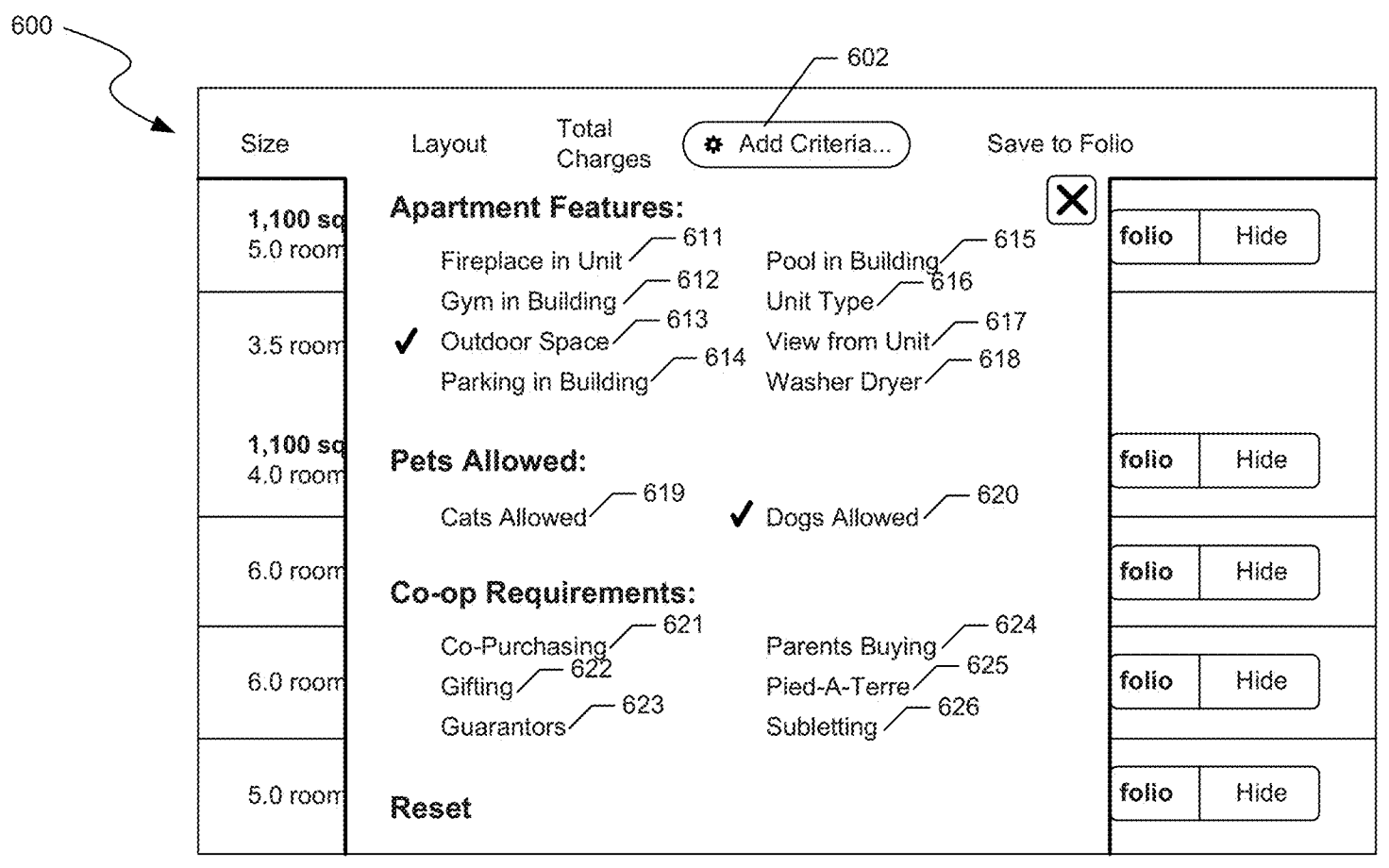

FIG. 6 is an image diagram showing an example user interface for selecting the subsequent display group of one or more property attributes to supplement the display of the search result. To invoke this user interface 600, a user clicks on the button 602 on the user interface for initially displaying the result of searching the property database. As a result, the facility displays this user interface 604 listing property attributes that are not in the initial display group. The user can then select property attributes from the list by turning on any of the checkmarks 611-626 in front of the listings of these property attributes. In this example, the user turns on the checkmark 613 for having outdoor space and the checkmark 620 for allow dogs. As a result, the facility includes the selected property attributes in the subsequent display group. The user can also deselect certain property attributes from the list by turning off the corresponding checkmarks.

In step 308, the facility displays the search result by also showing values of the property attributes in the subsequent display group for each property included in the search result. As one example, the facility may do so by refreshing the display in the original user interface. As another example, the facility may do so by presenting a separate display in a different user interface. In some embodiments, the facility sorts the result by one or more properties in the initial and subsequent display groups based on a user instruction and redisplays the result to the user. Given the enhanced display of the search result, a user may also realize how to further narrow the search. Therefore, in some embodiments, the facility allows the user to modify the search criteria by varying the acceptable values or changing the search group of one or more property attributes. The above-mentioned features of the facility provide a user with a customized presentation of the properties of interest and enable the user to make an intelligent decision on which property to buy or rent.

Figure 7:
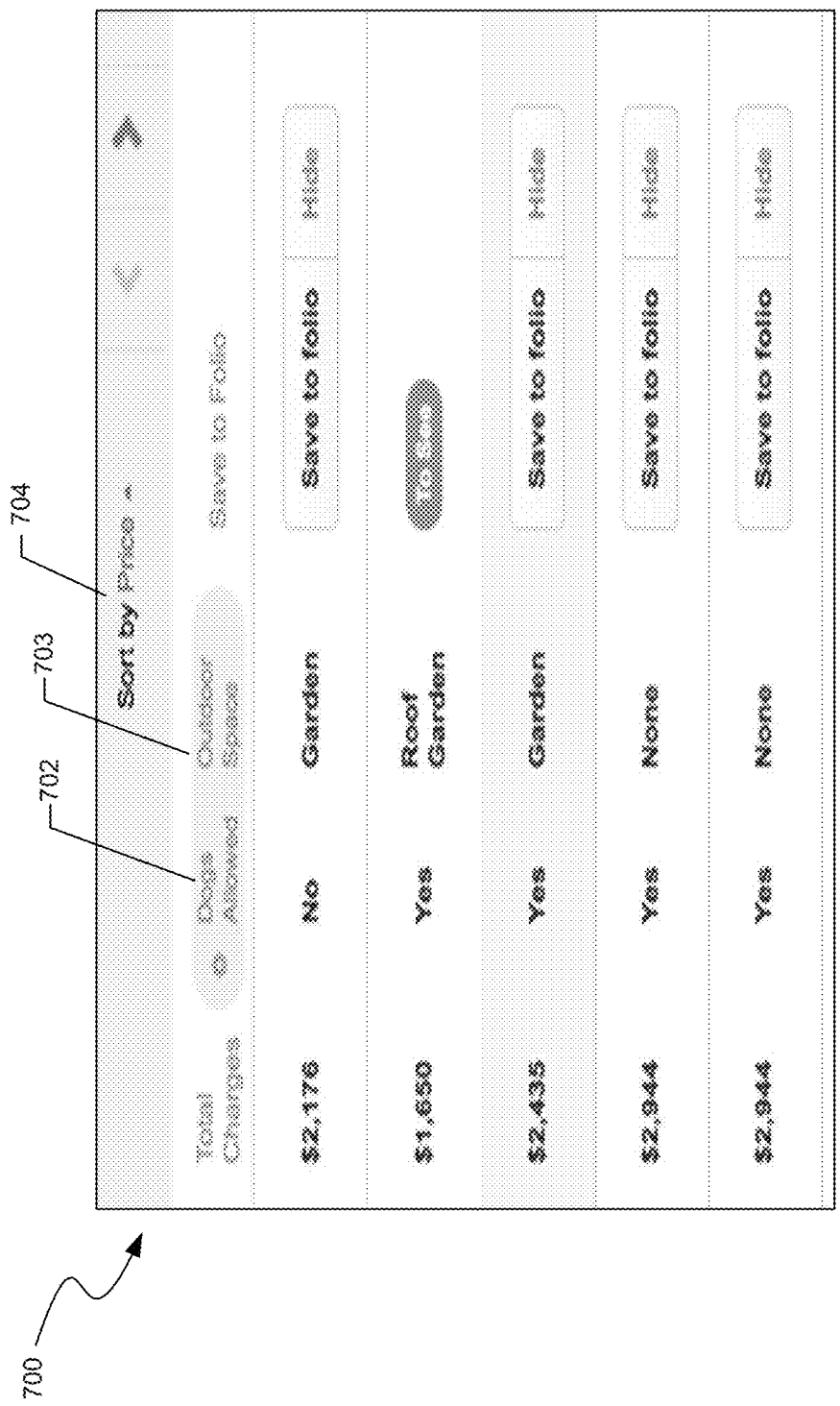
FIG. 7 is an image diagram showing an example user interface for displaying a result of searching a property database in response to a selection of a group of one or more property attributes for display.

FIG. 7 is an image diagram showing an example user interface for displaying the result of searching the property database in response to the selection of the subsequent display group of one or more property attributes. With this user interface 700, in response to a user selection of the property attributes of having outdoor space and allowing dogs, the facility now shows, for each property included in the search result, the values of these two property attributes in columns 702 and 703 in addition to the values of the property attributes previously shown. The user may then access the drop-down list 704 to sort the result by one or more property attributes of which the values are shown for the properties included in the search result.

Those skilled in the art will appreciate that the steps shown in FIG. 3 may be altered in a variety of ways. For example, the order of the steps may be rearranged; some steps may be performed in parallel; shown steps may be omitted, or other steps may be included; a shown step may be divided into substeps, or multiple shown steps may be combined into a single step, etc.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A non-transitory computer-readable storage medium storing instructions that, when executed by a computing system, cause the computing system to perform a process for adjusting a display of a result of searching a property database, the process comprising:
   causing, by the computing system, display of a first set of results of searching the property database using a search filter based on a first group of one or more property attributes,
      wherein each result of the first set of results corresponds to one or more properties that satisfies the search filter and displays a second group of one or more property attributes, and wherein the first set of results are organized in the display according to at least one property attribute in the second group of one or more property attributes;
   receiving, by the computing system, user input selecting a third group of one or more property attributes which are not in the second group; and
   causing, by the computing system, display of a second set of results, including one or more result of the first set of results of searching the property database using the search filter based on the first group of one or more property attributes, the second set of results containing one or more of the results from the first set of results with additional property attributes corresponding to the one or more property attributes in the third group.

2. The non-transitory computer-readable storage medium of claim 1, wherein the display of the second set of results includes displaying a table with the second set of results, wherein rows of the table correspond to the properties that satisfy the search filter and columns of the table correspond to the property attributes in the second and third groups.

3. The non-transitory computer-readable storage medium of claim 1, wherein the display of the second set of results includes refreshing the displayed first set of results to include additional columns which correspond to the one or more property attributes in the third group.

4. The non-transitory computer-readable storage medium of claim 1, wherein the one or more property attributes in the third group are not in the first group.

5. The non-transitory computer-readable storage medium of claim 1, wherein the second group includes the first group.

6. The non-transitory computer-readable storage medium of claim 1, wherein the second set of results are displayed in a table and the process further comprises receiving user input selecting a column of the table on which to sort the table.

7. The non-transitory computer-readable storage medium of claim 1, wherein the display of the first set of results and/or the display of the second set of results includes displaying a list of results.

8. The non-transitory computer-readable storage medium of claim 1, wherein the display of the first set of results and/or the display of the second set of results includes displaying a table of results.

9. The non-transitory computer-readable storage medium of claim 1, wherein the display of the second set of results excludes display of at least one of the property attributes from the second group.

10. The non-transitory computer-readable storage medium of claim 1, wherein the display of the second set of results is in a second user interface different from a first user interface in which the first set of results was displayed.

11. The non-transitory computer-readable storage medium of claim 1, wherein the display of the second set of results is in a webpage.

12. The non-transitory computer-readable storage medium of claim 1, wherein each of the results of the first set of results, that corresponds one or more properties that satisfies the search filter, is a real-estate listing.

13. A method performed by a computing system for adjusting a display of a result of searching a real-estate database, the method comprising:
    causing, by the computing system, display of a first set of results of searching the real-estate database using a search filter based on a first group of one or more real-estate property attributes,
        wherein each result of the first set of results corresponds to one or more real-estate properties that satisfies the search filter and displays a second group of one or more real-estate property attributes, and wherein the first set of results are organized in the display according to at least one real-estate property attribute in the second group of one or more real-estate property attributes;
    receiving, by the computing system, user input selecting a third group of one or more real-estate property attributes which are not in the second group; and
    causing, by the computing system, display of a second set of results, including one or more result of the first set of results of searching the real-estate database using the search filter based on the first group of one or more real-estate property attributes, the second set of results containing one or more of the results from the first set of results with additional real-estate property attributes corresponding to the one or more real-estate property attributes in the third group.

14. The method of claim 13, wherein the display of the second set of results includes refreshing the displayed first set of results to include additional columns which correspond to the one or more real-estate property attributes in the third group.

15. The method of claim 13, wherein the second group includes the first group.

16. The method of claim 13, wherein the display of the first set of results and/or the display of the second set of results includes displaying a list or a table of results.

17. The method of claim 13, wherein the display of the second set of results is in a second user interface different from a first user interface in which the first set of results was displayed.

18. A computing system comprising:
    one or more processors; and
    one or more memories storing instructions that, when executed by the one or more processors, cause the computing system to perform a process for adjusting a display of a result of searching a real-estate database, the process comprising:
        causing, by the computing system, display of a first set of results of searching the real-estate database using a search filter based on a first group of one or more real-estate property attributes,
            wherein each result of the first set of results corresponds to one or more real-estate properties that satisfies the search filter and displays a second group of one or more real-estate property attributes, and wherein the first set of results are organized in the display according to at least one real-estate property attribute in the second group of one or more real-estate property attributes;
        receiving, by the computing system, user input selecting a third group of one or more real-estate property attributes which are not in the second group; and
        causing, by the computing system, display of a second set of results, including one or more result of the first set of results of searching the real-estate database using the search filter based on the first group of one or more real-estate property attributes, the second set of results containing one or more of the results from the first set of results with additional real-estate property attributes corresponding to the one or more real-estate property attributes in the third group.

19. The computing system of claim 18, wherein the display of the second set of results includes refreshing the displayed first set of results to include additional columns which correspond to the one or more real-estate property attributes in the third group.

20. The computing system of claim 18, wherein the display of the second set of results is in a second user interface different from a first user interface in which the first set of results was displayed.

* * * * *